US010715788B2

(12) United States Patent
Sheridan

(10) Patent No.: US 10,715,788 B2
(45) Date of Patent: Jul. 14, 2020

(54) CAMERA ALIGNMENT AND/OR CALIBRATION METHODS AND APPARATUS

(71) Applicant: NextVR INC., Newport Beach, CA (US)

(72) Inventor: Ryan Michael Sheridan, Rancho Cucamonga, CA (US)

(73) Assignee: NextVR Inc., Newport Beach, CA (US)

( * ) Notice: Subject to any disclaimer, the term of this patent is extended or adjusted under 35 U.S.C. 154(b) by 39 days.

(21) Appl. No.: 15/650,905

(22) Filed: Jul. 15, 2017

(65) Prior Publication Data

US 2018/0020206 A1      Jan. 18, 2018

Related U.S. Application Data

(60) Provisional application No. 62/456,572, filed on Feb. 8, 2017, provisional application No. 62/363,198, filed on Jul. 15, 2016.

(51) Int. Cl.
*H04N 13/239* (2018.01)
*H04N 13/327* (2018.01)
(Continued)

(52) U.S. Cl.
CPC ......... *H04N 13/239* (2018.05); *H04N 13/246* (2018.05); *H04N 13/327* (2018.05); *G02B 30/26* (2020.01); *H04N 2213/001* (2013.01)

(58) Field of Classification Search
CPC .. H04N 13/239; H04N 13/327; H04N 13/246; H04N 2213/001; G02B 27/225
(Continued)

(56) References Cited

U.S. PATENT DOCUMENTS 7,023,473 B2     4/2006  Iwai et al.
8,619,248 B2 *  12/2013  Bassi ................. G01M 11/0264
                                                                356/127
(Continued)

FOREIGN PATENT DOCUMENTS

CA           2523061 A1    10/2006

OTHER PUBLICATIONS

Notification of Transmittal of the International Search Report and the Written Opinion If the International Searching Authority, or the Declaration with the International Search Report and Written Opinion of the International Searching Authority from application No. PCT/US 2017/042285 dated Jul. 15, 2017, pp. 1-6.

*Primary Examiner* — Tung T Vo
(74) *Attorney, Agent, or Firm* — Blank Rome LLP

(57) ABSTRACT

Methods and apparatus for aligning components of camera assemblies of one or more camera pairs, e.g., a stereoscopic camera pairs, are described. A camera calibration tool referred to as a camera bra is used. Each dome of the camera bra includes a test pattern, e.g., grid of points, with the domes being aligned and spaced apart by a predetermined amount. The bra is placed over the cameras of a camera pair, the grids are detected and displayed. The camera component positions are adjusted until the displayed images show the grids as being properly aligned. Because the grids on the calibration tool are properly aligned as a result of the manufacturing of the calibration tool, when the images are brought into alignment the cameras will be properly spaced and aligned at which point the calibration tool can be removed and the stereoscopic camera pair used to capture images of a scene.

18 Claims, 25 Drawing Sheets

(51) Int. Cl.
*H04N 13/246* (2018.01)
*G02B 30/26* (2020.01)

(58) Field of Classification Search
USPC .......................................................... 348/46
See application file for complete search history.

(56) References Cited

U.S. PATENT DOCUMENTS

| | | | |
|---|---|---|---|
| 2005/0280709 A1* | 12/2005 | Katayama | G01C 11/02 |
| | | | 348/187 |
| 2009/0237490 A1 | 9/2009 | Nelson, Jr. | |
| 2010/0245541 A1 | 9/2010 | Zhao et al. | |
| 2013/0176401 A1* | 7/2013 | Monari | H04N 5/2252 |
| | | | 348/47 |
| 2013/0265571 A1* | 10/2013 | Bassi | G01M 11/0264 |
| | | | 356/127 |
| 2016/0182903 A1* | 6/2016 | Grundhofer | G06T 7/80 |
| | | | 348/187 |
| 2016/0253795 A1* | 9/2016 | Cole | G06T 11/40 |
| | | | 345/426 |
| 2016/0373734 A1* | 12/2016 | Cole | H04N 13/232 |
| 2017/0243373 A1* | 8/2017 | Bevensee | G02B 3/0056 |
| 2018/0089903 A1* | 3/2018 | Pang | H04N 19/33 |
| 2018/0234676 A1* | 8/2018 | Cole | H04N 17/002 |

* cited by examiner

| FIGURE 23A |
| FIGURE 23B |
| FIGURE 23C |

CAMERA ALIGNMENT AND/OR CALIBRATION METHODS AND APPARATUS

RELATED APPLICATIONS

The present application claims the benefit of U.S. Provisional Patent Application Ser. No. 62/363,198 filed Jul. 15, 2016 and U.S. Provisional Patent Application Ser. No. 62/456,572 filed Feb. 8, 2017 which are each hereby expressly incorporated by reference in their entirety.

FIELD

The present invention relates to methods and apparatus for aligning and/or calibrating camera assemblies, e.g., cameras, and in particular, to methods and apparatus for aligning and/or calibrating components of camera assemblies of, for example, one or more stereoscopic camera pairs.

BACKGROUND

For supporting 3D, e.g., stereoscopic, image capture, pairs of cameras are sometimes used. Fisheye camera lenses are sometimes used for cameras of stereoscopic pairs. It can be important to compensate for distortions introduced by individual fish eye lenses if a high image quality is desired.

Camera lenses of individual cameras may be calibrated based on a particular orientation in the camera in which the lens is used. If the lens orientation changes, e.g. a lens is rotated unintentionally from the position at which it was calibrated, correction information for the lens generated during calibration may no longer be applicable since it is intended to be used with a particular lens orientation and may in fact degrade image quality if used rather than enhance it. In addition to lens orientation and/or alignment, correct spacing between camera lenses of a stereoscopic camera pair can be important for quality stereoscopic images captured using camera pairs, e.g., left and right eye cameras.

While lenses, cameras and/or camera pairs used for stereoscopic image capture may be calibrated and aligned prior to shipment, during shipment the cameras and/or camera pairs are often subject to shocks which can alter the careful alignment of the cameras and/or lenses. Unfortunately at a sports stadium or other site where the cameras may be used to capture images, the camera operator or field technician may not have a large calibration apparatus available to check the alignment and spacing of cameras of a stereoscopic camera pair and/or the components of such a camera pair. As should be appreciated miss-alignment of camera components and/or miss-spacing of cameras of a stereoscopic camera pair can significantly impact the quality of captured stereoscopic image content.

A significant problem with attempting to use camera pairs to capture images that have been subject to the stress and shocks of shipment to a site where they are to be used and/or subject to stress or shocks that may be incurred during normal use at a site, is that the cameras of a camera pair, or the components of a camera pair may become miss-aligned or miss-spaced relative to one another. For example, one camera lens may be angled slightly differently than the lens of the other camera, rotated relative to its original calibration position and/or the spacing between camera lenses may be different from what is intended.

In view of the above it should be appreciated that there is a need for methods and apparatus which allow a field technician to check camera alignment, camera spacing and/or alignment of the components of a stereoscopic pair and/or which would allow a field technician to perform a calibration of a camera pair in the field, e.g., at the site where the camera pair is to be used.

While not necessary for all embodiments it would be desirable if in at least some embodiments the tools and/or devices used as part of performing a field calibration were easy to transport and/or use at a site where a stereoscopic camera pair is to be used to capture images.

In view of the above it should be appreciated that there is a need for methods and/or apparatus that can be used to facilitate achieving a desired alignment of one or more camera pairs and/or components and/or which can be used to facilitate a field calibration of cameras or camera components of a stereoscopic camera pair.

SUMMARY

Methods and apparatus for aligning cameras of a camera pair, e.g., a stereoscopic camera pair, are described. The methods and apparatus are well suited for aligning pairs of a stereoscopic pair to achieve reliable camera spacing between the cameras of the stereoscopic camera pair and/or orientation of cameras or camera components of a stereoscopic camera pair.

Various features relate to a camera pair calibration tool that includes a first dome and a second dome where the first and second domes are rigidly attached to each other by an attachment member extending between the first and second domes. The domes are sometimes made of plastic, resin or another generally rigid material. In some embodiments the domes and attachment member are printed plastic or resin devices which can be generated with a high degree of accuracy. The domes and attachment member may be, and sometimes, are implemented as a single device that is cast, printed, molded or otherwise formed as a single unit. The calibration device including the domes is sometimes referred to as a camera bra because of the calibration device's similarity in shape to a bra. During use the calibration device can be, and sometimes is, placed over the lenses of a stereoscopic camera pair with the calibration device fitting snuggly over the lens assemblies and/or lens holders in which the camera lenses are mounted.

The domes may be and sometimes do include cutouts and/or indents to allow the calibration device to fit over the lens assemblies in a manner that takes into consideration the shape of the lenses assemblies over which the calibration device may be placed which can vary depending on the cameras and/or lenses being used.

The calibration device when placed over the lenses of a stereoscopic camera pair fit snuggly blocking outside light from reaching the sensors of the cameras in the stereoscopic camera pair. While the calibration device has a fixed shape and spacing between the domes of the calibration device, the cameras can be moved and the position of the components of the cameras and/or camera assemblies of the stereoscopic pair can be adjusted while the calibration device is positioned over the lens assemblies. Thus while the distance between the center of the domes of the calibration device remain fixed, spacing between the cameras of the stereoscopic camera pair being calibrated as well as the position and/or tilt of the lenses and/or lens assemblies of the camera assemblies forming the stereoscopic camera pair.

In various embodiments the domes of the camera calibration device include small holes through which light is supplied. In some embodiments fiber optic fibers, e.g., glass fibers, are inserted into the holes to direct light from a light source into the dome or domes. In some but not necessarily all embodiments the holes in the dome form a pattern which serves as a calibration pattern.

In at least some, but not necessarily all embodiments, the calibration pattern of a dome of the calibration device matches the calibration pattern of a larger calibration chart or calibration device that was previously used to calibration a camera of the stereoscopic camera pair or the set of cameras of the stereoscopic camera pair. The use of a calibration test pattern, in terms of point locations which matches that of a previous calibration test pattern can be useful in determining if the camera components have changed position from the time of the previous calibration and thus whether a previous calibration remains reliable or if scrutiny to the camera alignment should be give due to a difference from the previous calibration. In at least some cases the previous calibration was performed prior to shipment of the cameras of the stereoscopic camera pair to a site where they will be used.

While the same color light can be supplied to the fibers entering each of the domes, in some embodiments different color light is supplied by a light source to the first and second domes of each pair allowing an operator to easily determine whether he is viewing an image captured from the inside of the first or second domes based on the color of light displayed.

In at least some embodiments, an image or images is captured by a first camera sensor of a first camera assembly viewing the inside of a first dome of the calibration device. The position of one or more components of the first camera assembly are adjusted to so that the test pattern visible in the image captured by the first camera assembly and displayed on a display are aligned with a cross or other alignment pattern displayed on the display. The first camera assembly may be and sometimes is a first camera device which includes a first camera body which houses both a first camera sensor and a first processor. In other embodiments the first camera assembly includes a first sensor which is mounted outside the first camera body which houses the first camera processor with the first sensor being coupled to the first processor by a cable.

An image or images are then captured by a second camera sensor of a second camera assembly viewing the inside of a second dome of the calibration device. The position of one or more components of the second camera assembly are adjusted to so that the test pattern visible in the image captured by the second camera assembly and displayed on the display are aligned with the cross or other alignment pattern displayed on the display. The second camera assembly may be and sometimes is a second camera device which includes a second camera body which houses both a second camera sensor and a second processor. In other embodiments the second camera assembly includes a second sensor which is mounted outside the second camera body which houses the second camera processor with the second sensor being coupled to the second processor by a cable.

In some embodiments after one of the first and second camera assemblies is aligned by adjusting one or more camera components, the image captured by the other one of the camera assemblies is superimposed over the image captured by the aligned camera assembly. Adjustments are made to the non-aligned camera assembly to bring the components into proper position/alignment. When proper calibration of two camera assemblies is achieved, the superimposed images of the inside of the camera bra will show a superimposed calibration pattern from the first and second domes which are aligned with the cross hare or other displayed calibration mark and which are also aligned with respect to each other. Because the spacing and orientation of the calibration patterns of the domes is fixed, alignment of the two captured images is indicate of proper alignment and positioning of the components of the first and second camera assemblies of a stereoscopic camera pair.

By using the camera pair calibration tool of the present invention, a camera operator can easily check the positioning and/or alignment of cameras in a stereoscopic camera pair at a site where the cameras are to be used with relatively little effort and/or training. In addition the camera operator can quickly see and assess the effect of adjustments being made while the camera calibration device remains in place over the lenses of a stereoscopic camera pair.

Numerous additional benefits features and embodiments are discussed in the detailed description which follows.

DETAILED DESCRIPTION

Figure 1:
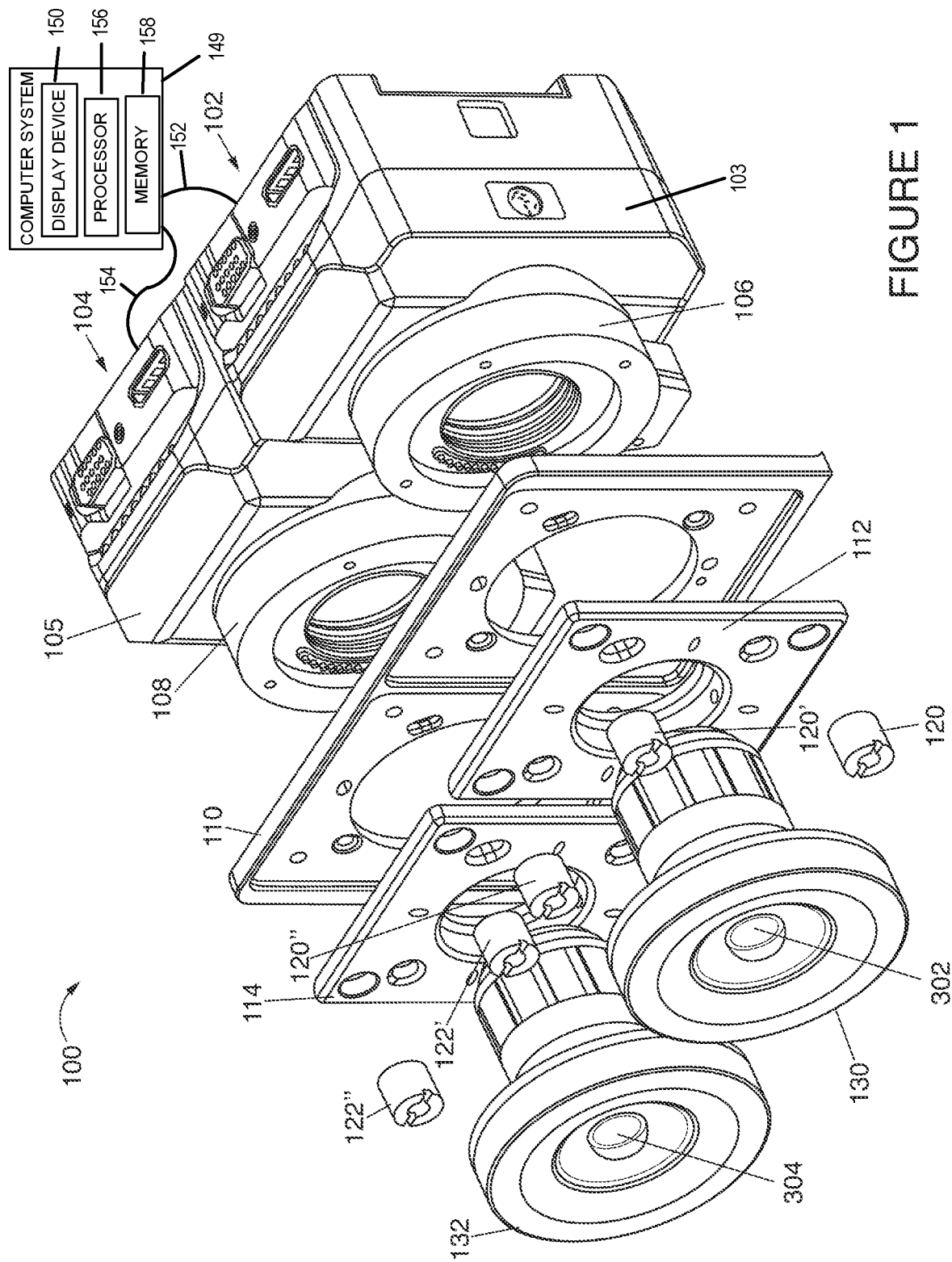
FIG. 1 illustrates an exemplary camera device pair and a mounting plate to which the camera devices including camera bodies and corresponding lens assemblies can be secured.

FIG. 1 illustrates an exemplary stereoscopic camera apparatus 100 including a camera device pair 102, 104 and a mounting plate 110 to which the camera devices including camera bodies 103, 105 and corresponding lens assemblies 130, 132 can be secured. Adjustment plate 112, 114 allow the positions of the cameras and/or tilt of the cameras to be adjusted. Exemplary stereoscopic camera apparatus 100 includes a stereoscopic camera pair having a left eye camera device 102 and a right eye camera device 104, a dual camera body mounting plate 110, a pair of left and right eye camera lens assemblies 130, 132, a pair of individual lens mounting plates 112, 114, and a plurality of adjustment bushings (120, 120', 120", 120''', 122, 122', 122", 122''') or which adjustments bushings (120, 120', 120", 122' and 122") are visible. The lens assemblies 130, 132 include wide angle lenses, e.g., fisheye lenses 302, 304. The left eye camera device 102 and the right eye camera device 104 each comprise an outer camera body or shell and a lens housing. For example camera device 102 includes camera body 103 and lens collar 106. Camera device 104 includes camera body 105 and lens collar 108. The lens assembly 130 can be inserted in to the lens collar 106 and secured to the single lens mounting plate 112 via set screws which extend through the single lens mounting plate 112 and press against the side of the lens assembly 130 as will be discussed further below. The lens assembly 132 can be inserted in to the lens collar 108 and secured to the single lens mounting plate 114 via set screws which extend through the single lens mounting plate 114 and press against the side of the lens assembly 132 when assembled. While not visible in FIG. 1, each of the left eye camera device 102 and a right eye camera device 104 includes an image sensor which is mounted inside the camera body 103, 105 onto which light may be directed by the lens assembly 130, 132, respectively. Lens assembly 130 includes lens 302, e.g., a fish eye lens. Lens assembly 132 includes lens 304, e.g., a fish eye lens.

Accurate alignment of left and right cameras and lens assemblies with respect to each other is highly desirable for high quality image capture and 3D image rendering. In accordance with the features of the present invention an alignment tool 200, also referred to as the camera bra 200, is used to align the left and right cameras (102, 104) to achieve a high degree of alignment accuracy. In various embodiments the camera bra 200 is affixed, e.g., placed over, the lens assemblies (130, 132,) including lenses (302, 304) and adjustments may be made in some embodiments in order to achieve a desirable level of alignment accuracy in accordance with the features of the present invention.

FIG. 1 further illustrates a computer system 149 including a display device 150, a processor 154, e.g., a CPU, and memory 156, coupled to the camera pair (102, 104), via cables (152, 154), respectively. Display device 150 displays captured images using the first camera 102 of the stereoscopic camera pair while a calibration bra 200 is placed over the lenses (302, 304) of the stereoscopic camera pair (102, 104) along with an alignment target. The position of at least a portion of the first camera 102 is adjusted to align one or more captured calibration marks captured by the first camera 102 with the alignment target. Display device 150 also displays captured images using the second camera 104 of the stereoscopic camera pair while a calibration bra 200 is placed over the lenses (302, 304) of the stereoscopic camera pair (102, 104) along with an alignment target. The position of at least a portion of the second camera 104 is adjusted to align one or more captured calibration marks captured by the second camera 104 with the alignment target. In various embodiments, display device 150 displays an image captured by the second camera device 104 over an image captured by the first camera device 102, as part of a calibration method.

FIGS. 2-9 show various perspective views of a camera alignment tool 200 referred to as a camera bra 200. The camera bra 200 can be secured by friction over the lens assemblies 130, 132 including lens 302, 304 of the stereoscopic camera pair shown in FIG. 1 with the inside surface (206, 208) of each dome (202, 204) of the camera bra 200 providing a camera (102, 104) with a view of a test pattern which may be formed by an array of fiber optic light points, one corresponding to each hole 207 in the camera bra 200.

Figure 2:
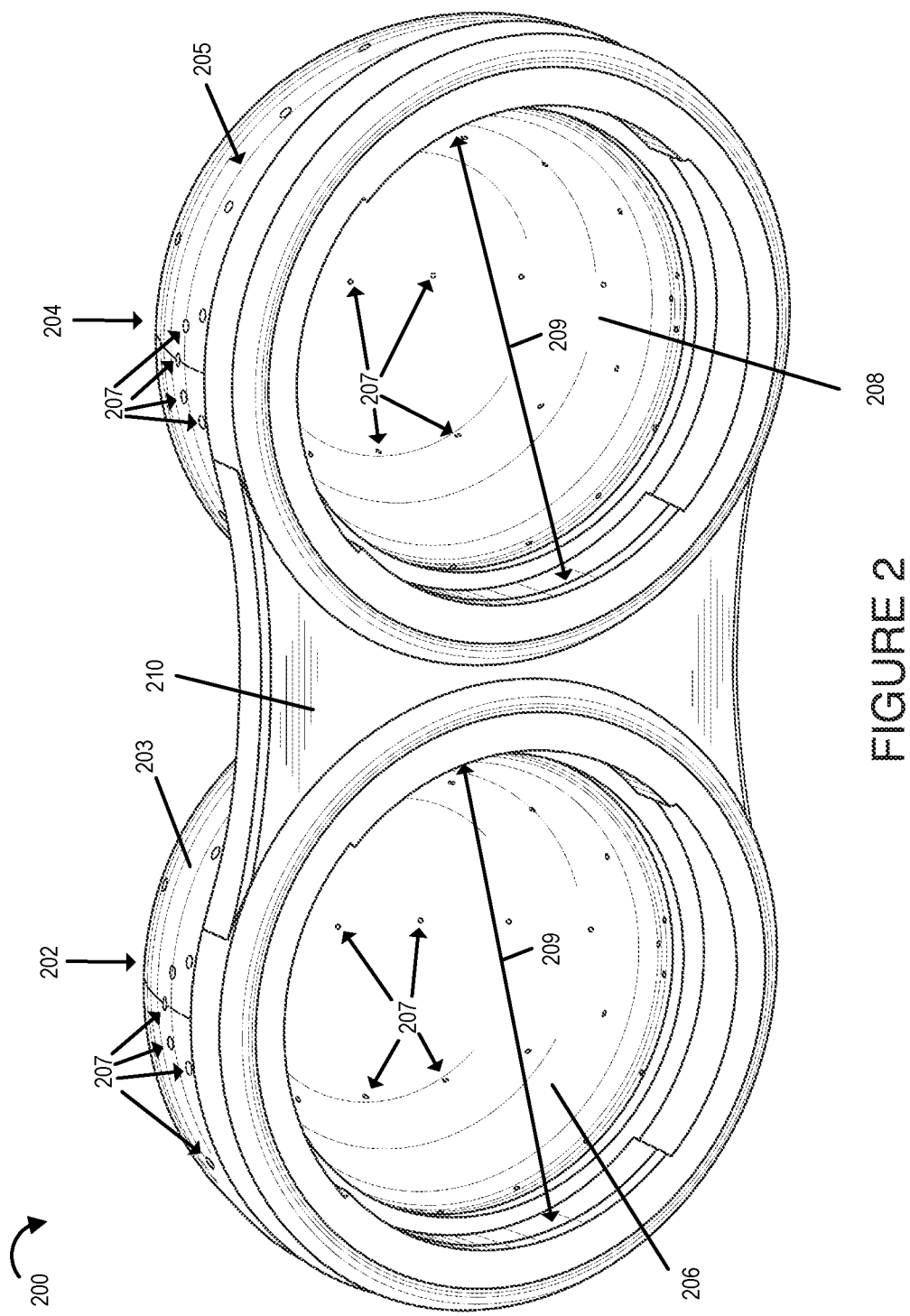
FIGS. 2-9 show various perspective views of an exemplary camera alignment tool referred to as a camera bra, which can be secured by friction over the lenses of the stereoscopic camera pair shown in FIG. 1.

FIG. 2 is a drawing illustrating one perspective view of an exemplary camera alignment tool 200 referred to as a camera bra 200. The camera bra 200 includes a first dome 202, e.g., a left dome, and a second dome 204, e.g., a right dome, which are rigidly attached to each other by an attachment member 210 extending between the first and second domes (202, 204). The camera bra's left dome 202 and right dome 204 are secured, e.g., by a friction fit, to the left and right lens assemblies (130, 132), respectively, corresponding to the left and right cameras (102, 104). As is obvious from the figure the outer portions (203, 205) of the domes (202, 204) protrudes while the inside portions (206, 208) are hollow. On the inside surface of the domes (206, 208) there are points 207, e.g., holes, which form a test pattern when a light source is connected to the camera bra 200 providing light via these points as discussed in more detail later. The camera bra 200 can be secured by friction over the lens assemblies (130, 132) including lenses (302, 304) of a stereoscopic camera pair, e.g., such as the one shown in FIG. 1, with the inside surface (206, 208) of each dome (202, 204) of the camera bra 200 providing the cameras (102, 104) with a view of a test pattern which may be formed by an array of fiber optic light points, one light point corresponding to each hole 207 in the camera bra 200. The openings (209) at the base of each of said first and second domes (202, 204) are of a size which allows said calibration tool (200) to be placed over the lens assemblies (130, 132) including lenses (302, 304) of said first and second cameras (102, 104) and be held in place by friction.

Each of the first and second domes (202, 204) of the camera bra 200 include a plurality of light emitting elements (1004) forming a pattern, e.g., a grid pattern, on the inside surface (206, 208) of the domes (202, 204). In some embodiments, each of the light emitting elements are fibers to which a light source 1002 supplies light, each fiber passing through a hole 207 in one the first and second domes (202, 204). In some other embodiments, each of the first and second domes (202, 204) of the camera bra 200 include marks forming a pattern, e.g., a grid pattern, on the inside surface (206, 208) of the domes (202, 204).

In some embodiments, the calibration tool, e.g., camera bra 200, is a printed plastic tool and the plastic blocks the transmission of light except though the holes 207 into which fiber optic lines 1004 are inserted to supply light at the predetermined grid points of the test pattern which is visible from inside each dome (202, 204) of the calibration tool 200.

Figure 3:
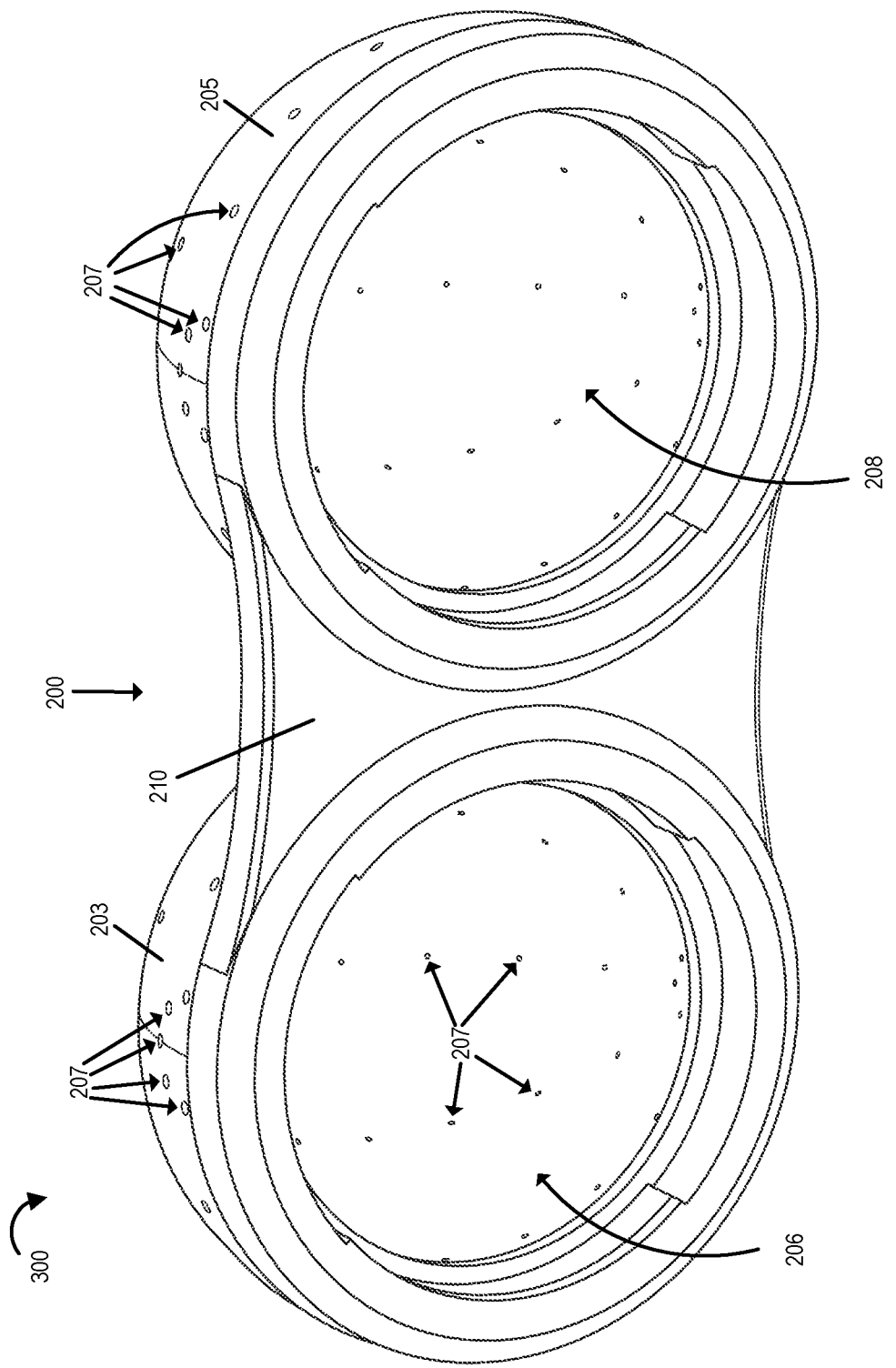

FIG. 3 is another drawing 300 showing the camera bra 200 from the same perspective as shown FIG. 2.

Figure 4:
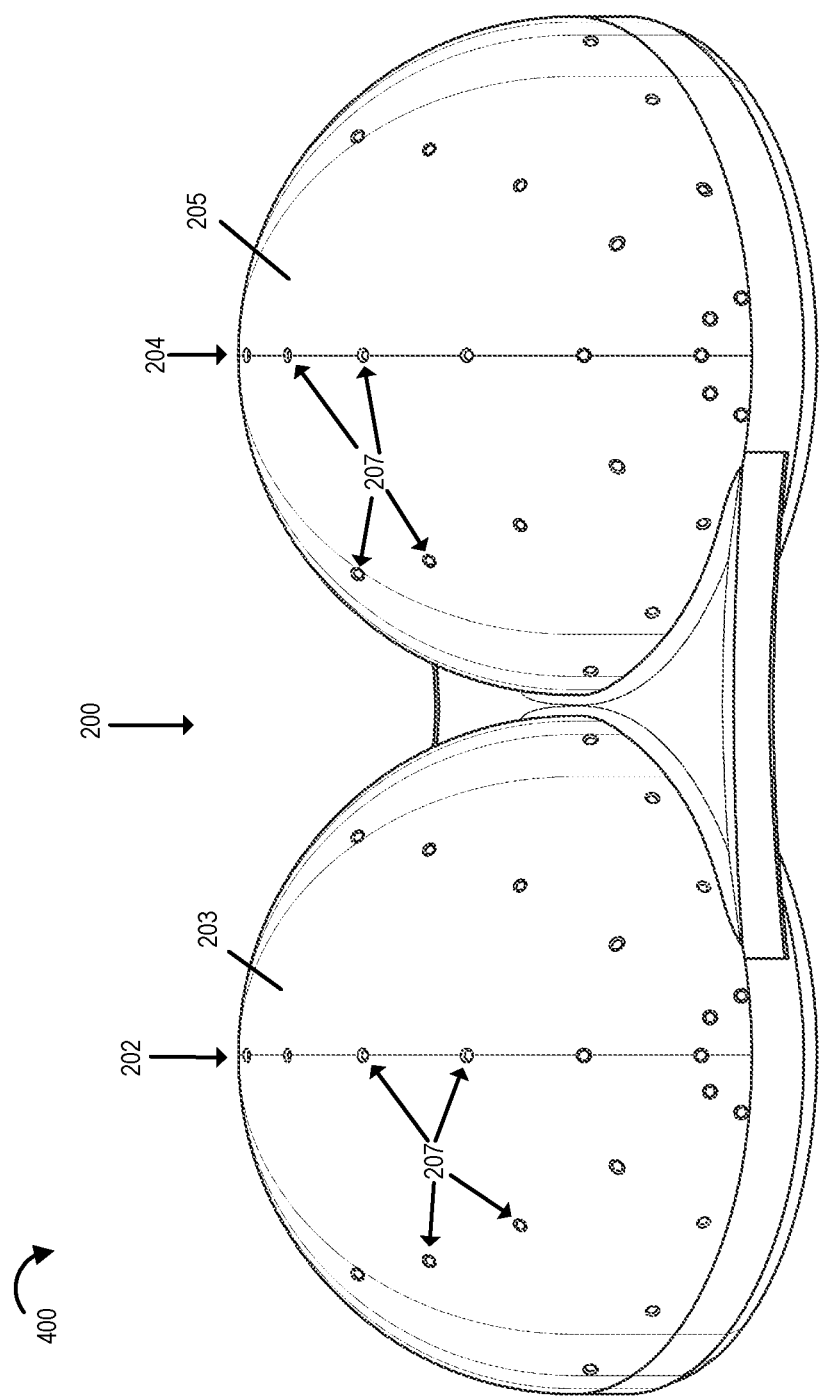

FIG. 4 is a drawing 400 illustrating another perspective view of the exemplary camera alignment tool 200 in which the outer surfaces (203, 205) of the two domes (202, 204) can be seen along with the holes 207 on the surface via which optical fibers 1004 can be coupled to the camera bra 200.

Figure 5:
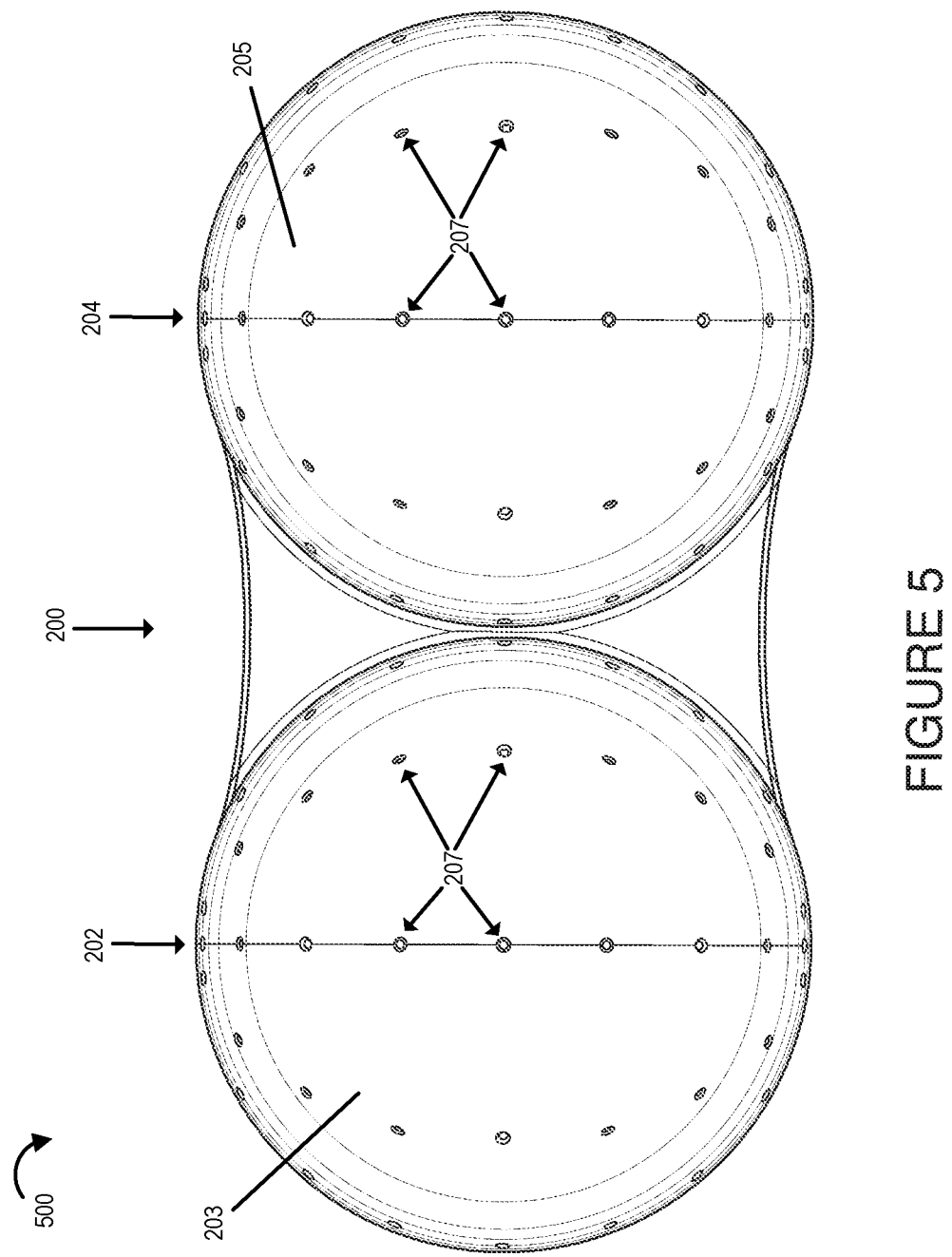

FIG. 5 is a drawing 500 illustrating an outer body view of the exemplary camera alignment tool 200 where the exemplary camera alignment tool 200 is shown as if being viewed by an observer looking straight at the camera bra 200 while facing the outer body of the camera bra.

Figure 6:
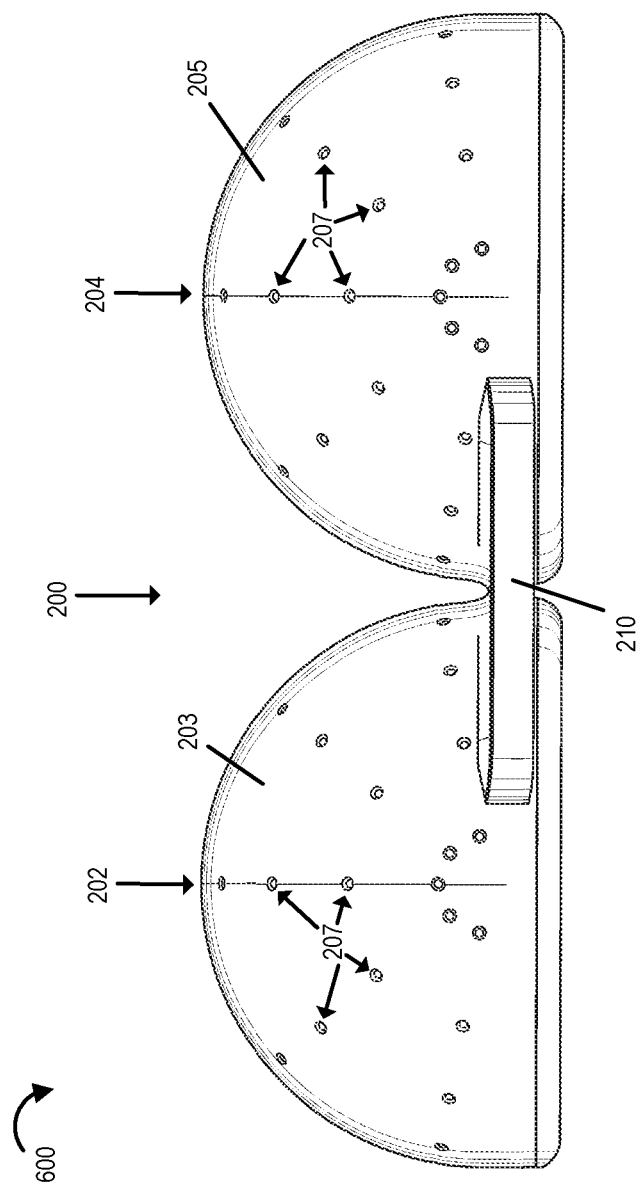

FIG. 6 is a drawing 600 illustrating a top view of the exemplary camera alignment tool 200 where the full length of the camera bra 200 as well as the pattern of various holes 207 on the outer body of the camera bra 200 can be appreciated as observed from the top looking down.

Figure 7:
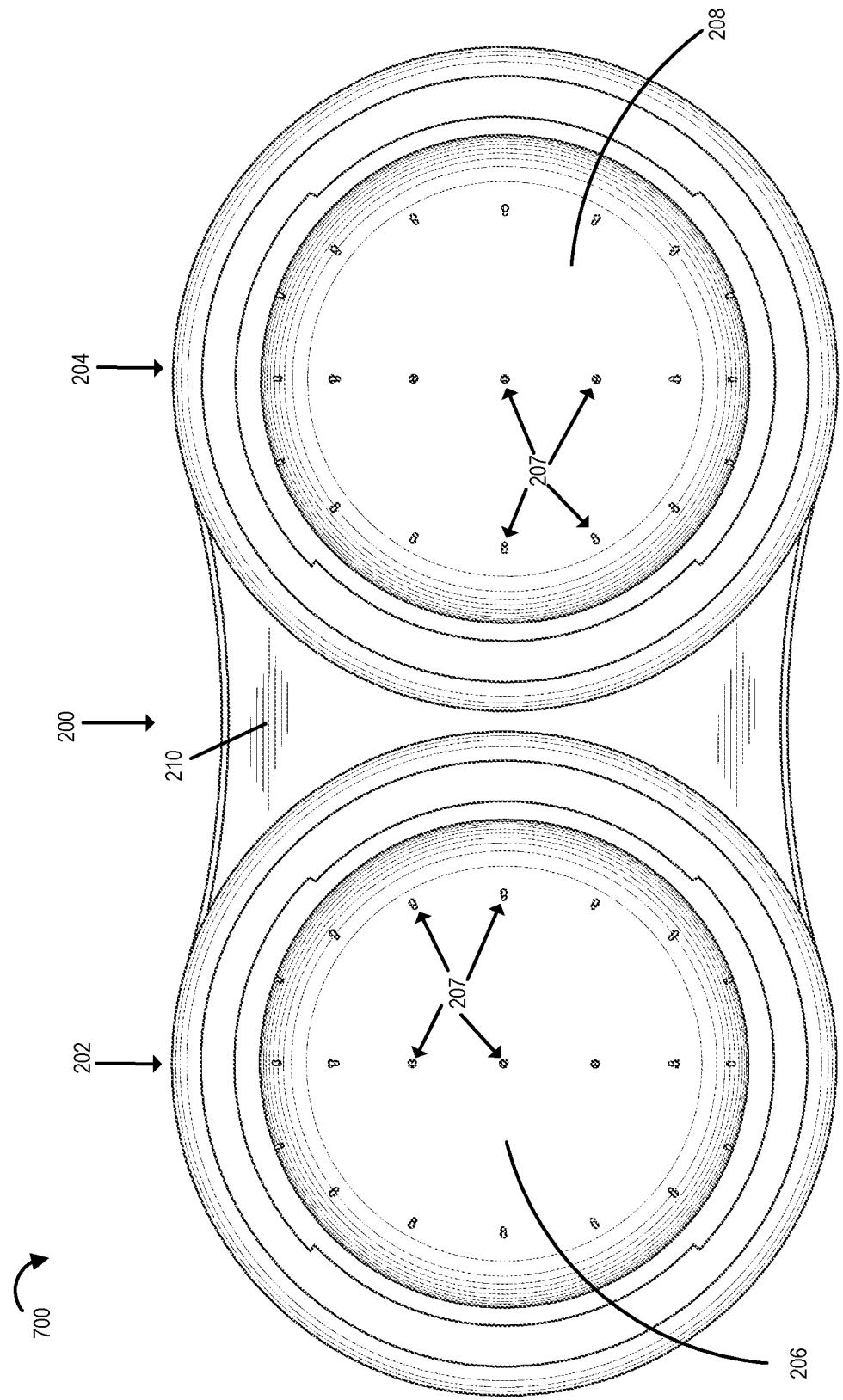

FIG. 7 is a drawing 700 illustrating a view of the exemplary camera alignment tool 200 showing the inside surfaces (206, 208) of the two domes (204, 204), and it can be seen where the test pattern is formed by the light points, each light point corresponding to a hole 207. The camera bra 200 can be simply coupled to the camera lens assemblies, e.g., by pressure and/or friction fit, such that the lenses face the pattern on the inside surface of the bra 200 once the camera bra 200 is fitted to the lens assemblies.

Figure 8:
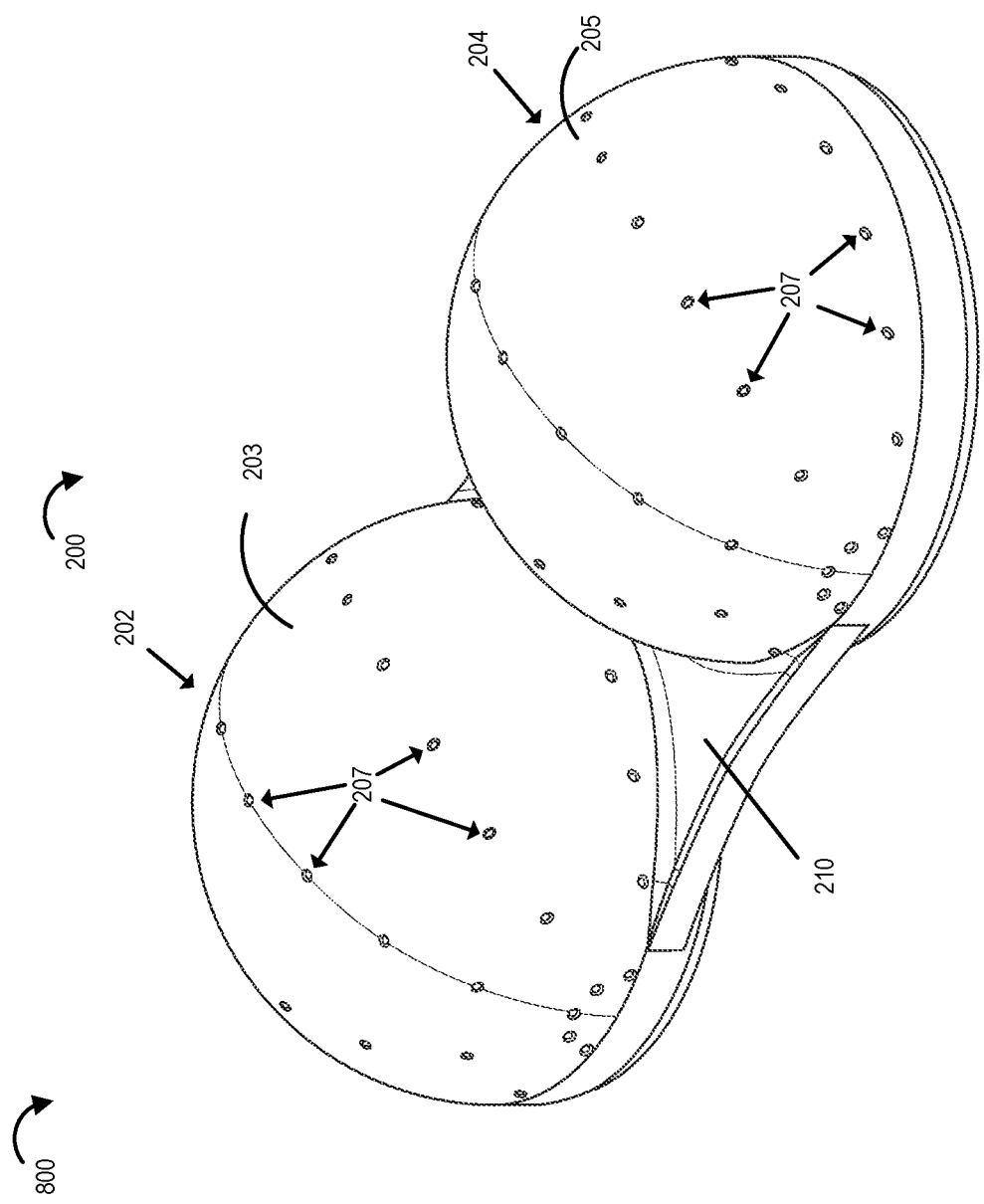

FIG. 8 is a drawing 800 illustrating another perspective view of the exemplary camera alignment tool 200 in which the outer body portion of the camera bra 200 including the outer dome surfaces (203, 205) of domes (202, 204) can be seen. Holes 207 for optical fibers 1004 to pass through are also shown on the bra 200, the holes 207 being intentionally positioned on the bra domes (202, 204) to form a pattern of light inside each dome (202, 204), based on light emitted from the optical fibers passing through the holes 207.

Figure 9:
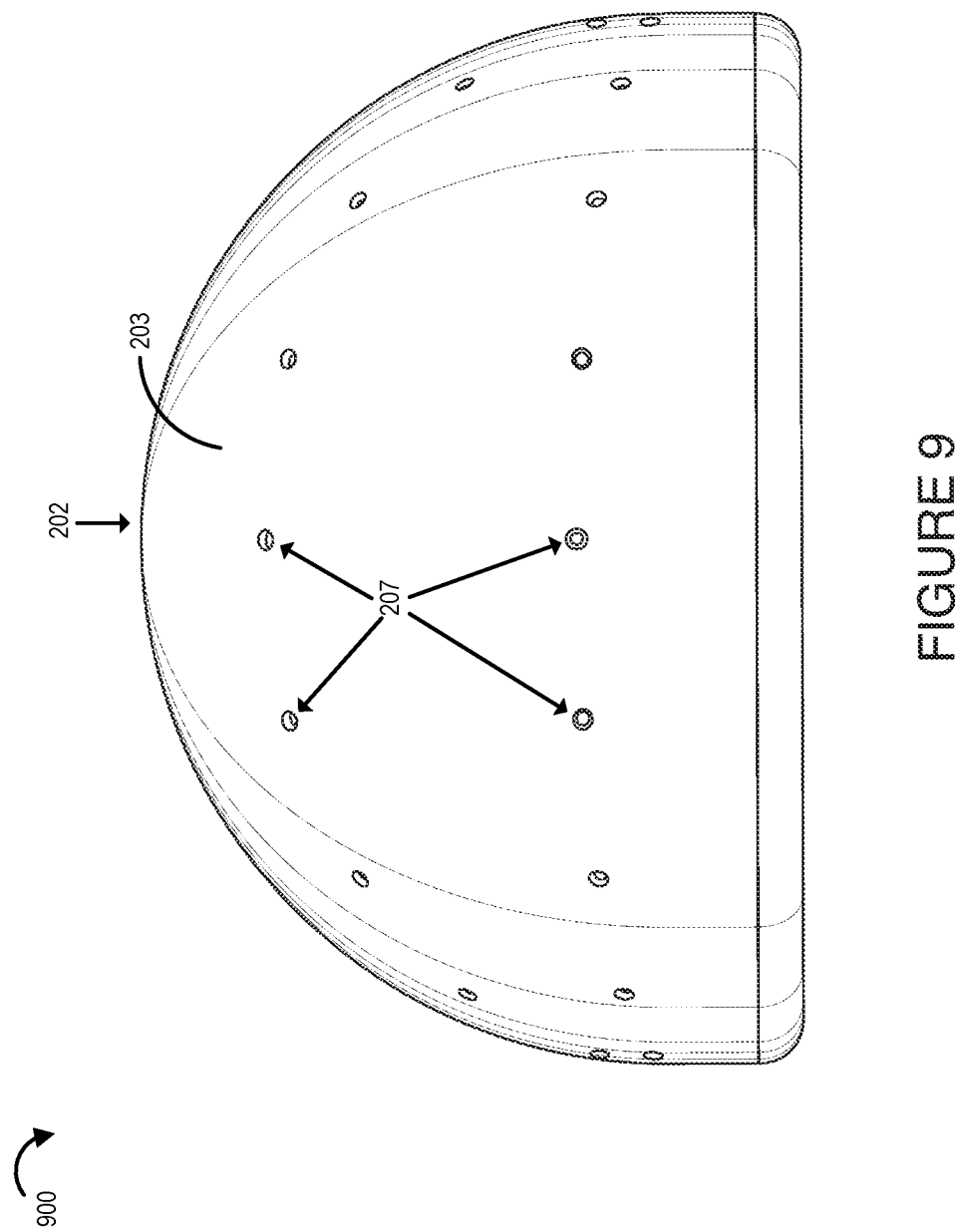

FIG. 9 is a drawing 900 illustrating a side view of the exemplary camera alignment tool 200 showing one side view of the outer body of one of the domes, e.g., outer surface 203 of left dome 202 of the camera bra 200. Holes 207 for optical fibers can also be seen.

Figure 10:
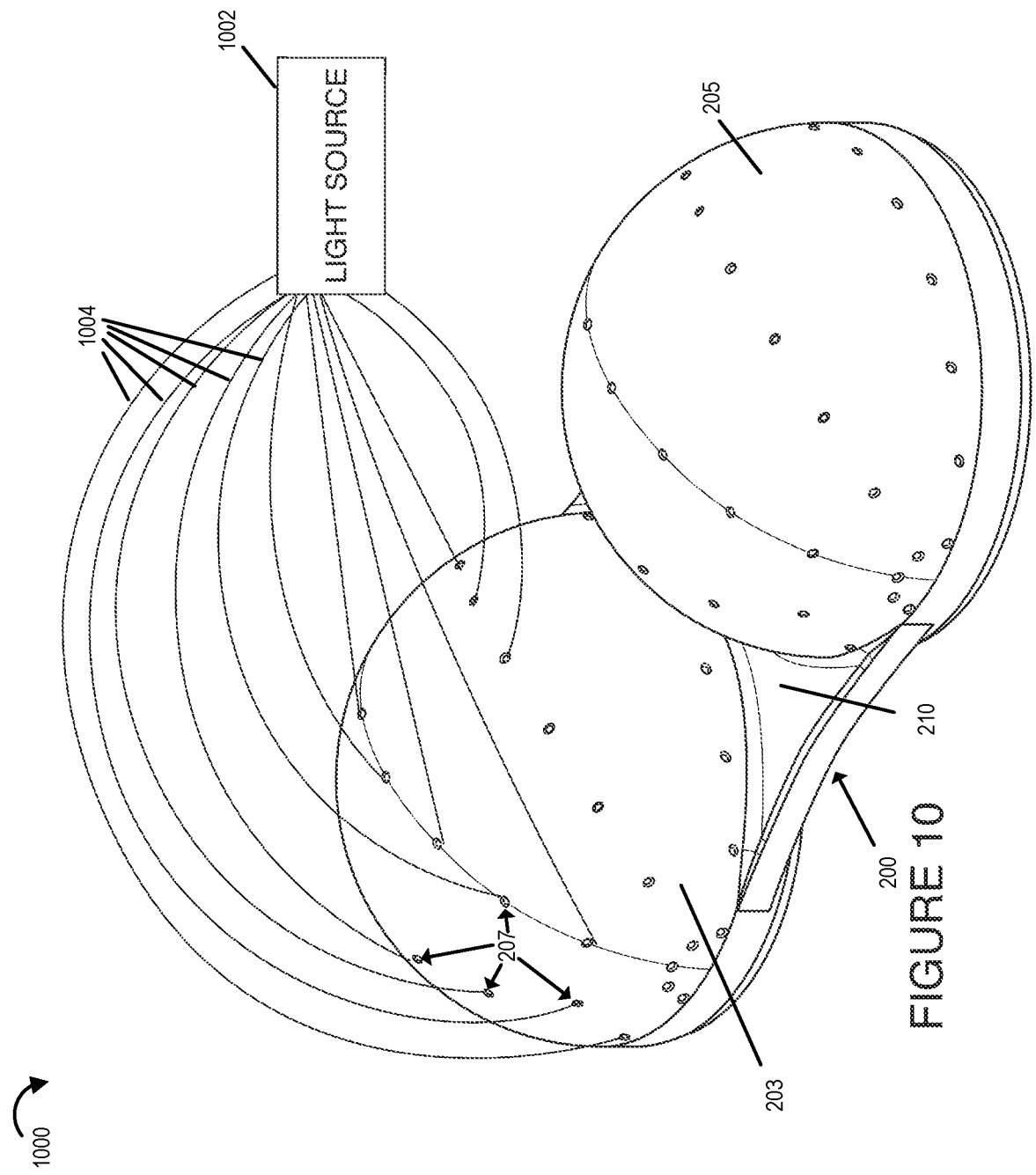
FIG. 10 shows how a light can be, and is in some embodiments, connected to the holes in the camera bra shown in the other figure by optical fibers which supply a point of light to the inside surface of the camera bra corresponding to the location of a hole; the points of light form a test pattern on the inside surface of the half sphere which is detected and used to facilitate camera alignment.

FIG. 10 is a drawing 1000 of an arrangement of the camera bra 200 in one embodiment illustrating how a light source 1002 supplying light to the camera bra 200 can be connected. The outer surfaces (203, 205) of the domes (202, 204) are visible in FIG. 10. In some embodiments the light, e.g., from light source 1002 is supplied via optical fibers 1004 represented in the figure by the group of curved black lines connecting the light source 1002 to the holes 207 in the camera bra dome 202. Once the light source 1002 is activated a point of light appears on the inside surface (206, 208) of the camera bra domes (202, 204) corresponding to each hole 207 to which an optical fiber 1004 is connected. The points of light form a test pattern on the inside surface of the half sphere which is detected, e.g., captured as an image by a connected camera, and used to facilitate camera alignment in accordance with the features of the present invention. In one exemplary embodiment, a first color light, e.g., green light, is supplied by a light source to the left dome 202 and a second color light, e. g., red light, is supplied by the light source to the right dome 204.

FIG. 10 shows how a light can be, and is in some embodiments, connected to the holes 207 in the camera bra 200 shown in the other figure by optical fibers 1004 which supply a point of light to the inside surface (206, 208) of the camera bra 200 corresponding to the location of a hole 207. The points of light form a test pattern on the inside surface (206, 208) of the half sphere (202, 204) which is detected and used to facilitate camera alignment.

Figure 11:
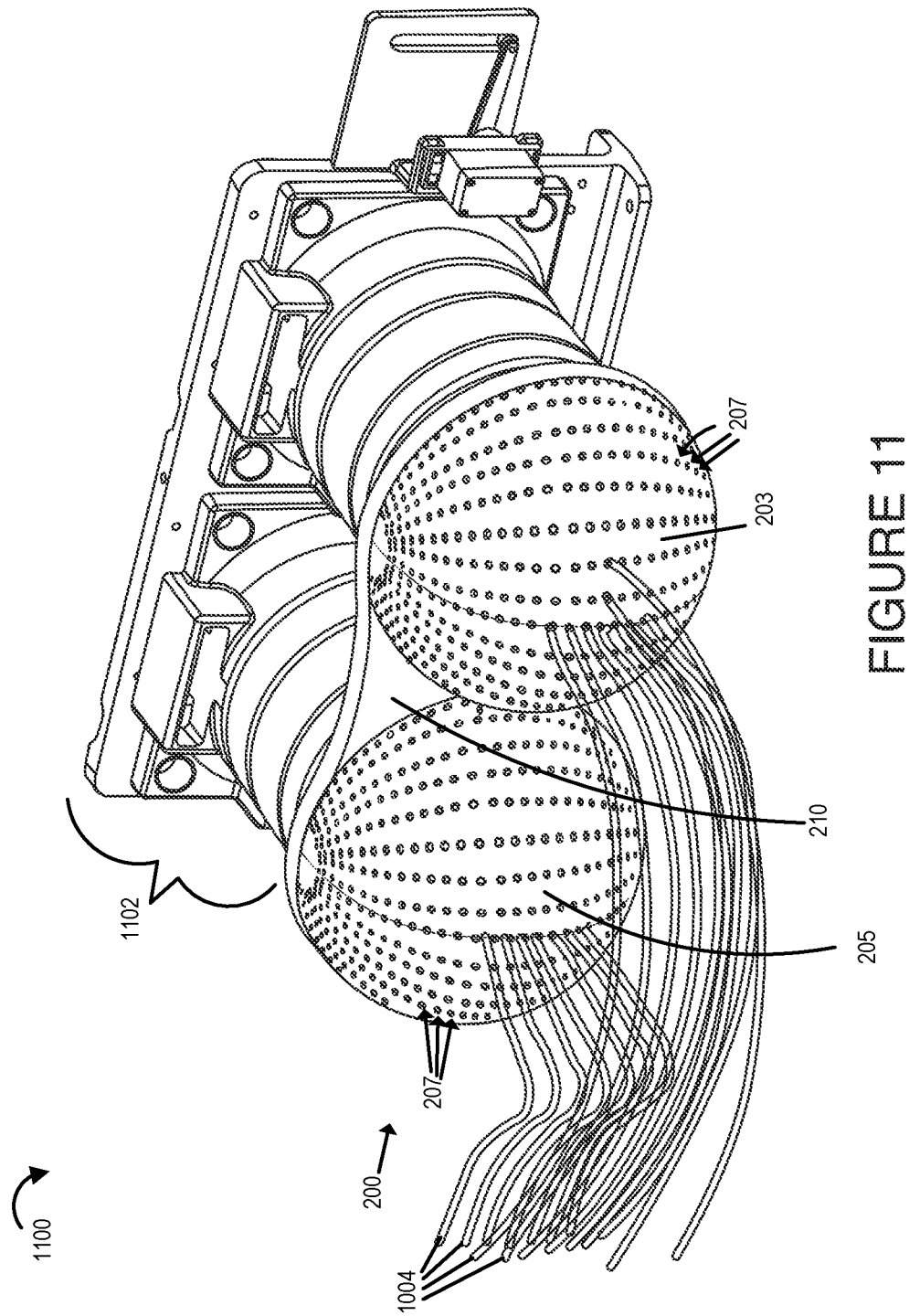
FIG. 11 shows the camera bra placed over the lenses of the cameras in a camera pair with fibers that can conduct light to the inside surface of the camera bra via holes to provide points of light that can be detected by the sensors of the cameras.

FIG. 11 illustrates an arrangement of an adjustable stereoscopic camera lens and sensor mounting assembly 1102 coupled to the camera bra 200 in accordance with one exemplary embodiment.

FIG. 11 shows a stereoscopic camera lens assembly and sensor mounting assembly 1102 of a stereoscopic camera pair assembly with the camera bra 200 placed over the lenses of the cameras in the camera pair with fibers 1004 that can conduct light to the inside surface (206, 208) of the camera bra 200 via holes 207 to provide points of light that can be detected by the sensors of the cameras. In various embodiments, the lens position and the sensor position of each camera in the camera pair can be, and sometimes is, adjusted while the camera bra 200 is installed.

Figure 12:
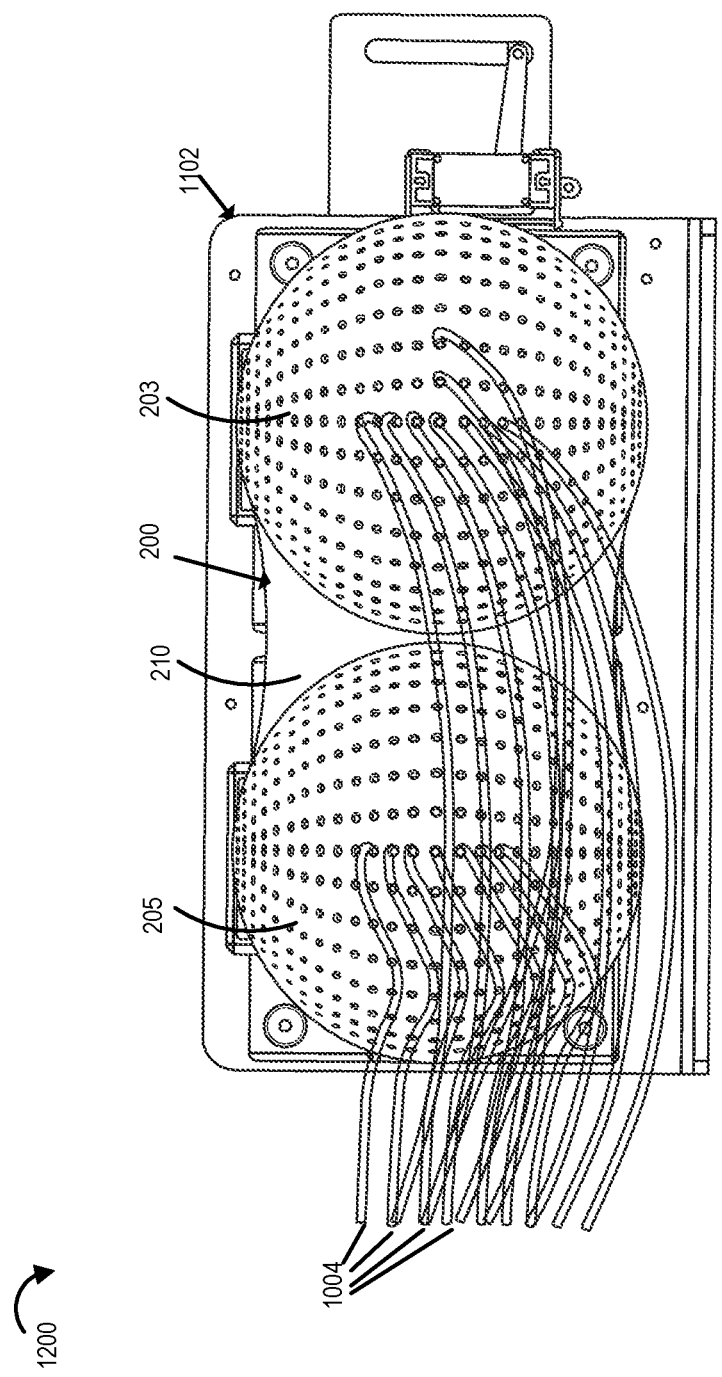
FIG. 12 is a more detailed frontal view of the calibration bra assembly which is placed over the lenses of a stereoscopic camera pair shown in FIG. 11.

FIG. 12 is a drawing 1200 which shows a more detailed frontal view of the stereoscopic camera pair lens and sensor mounting assembly 1102 with installed calibration bra camera bra 200 showing external dome surfaces (203, 205) with exemplary attached fibers 1004, as shown in FIG. 11.

Figure 13:
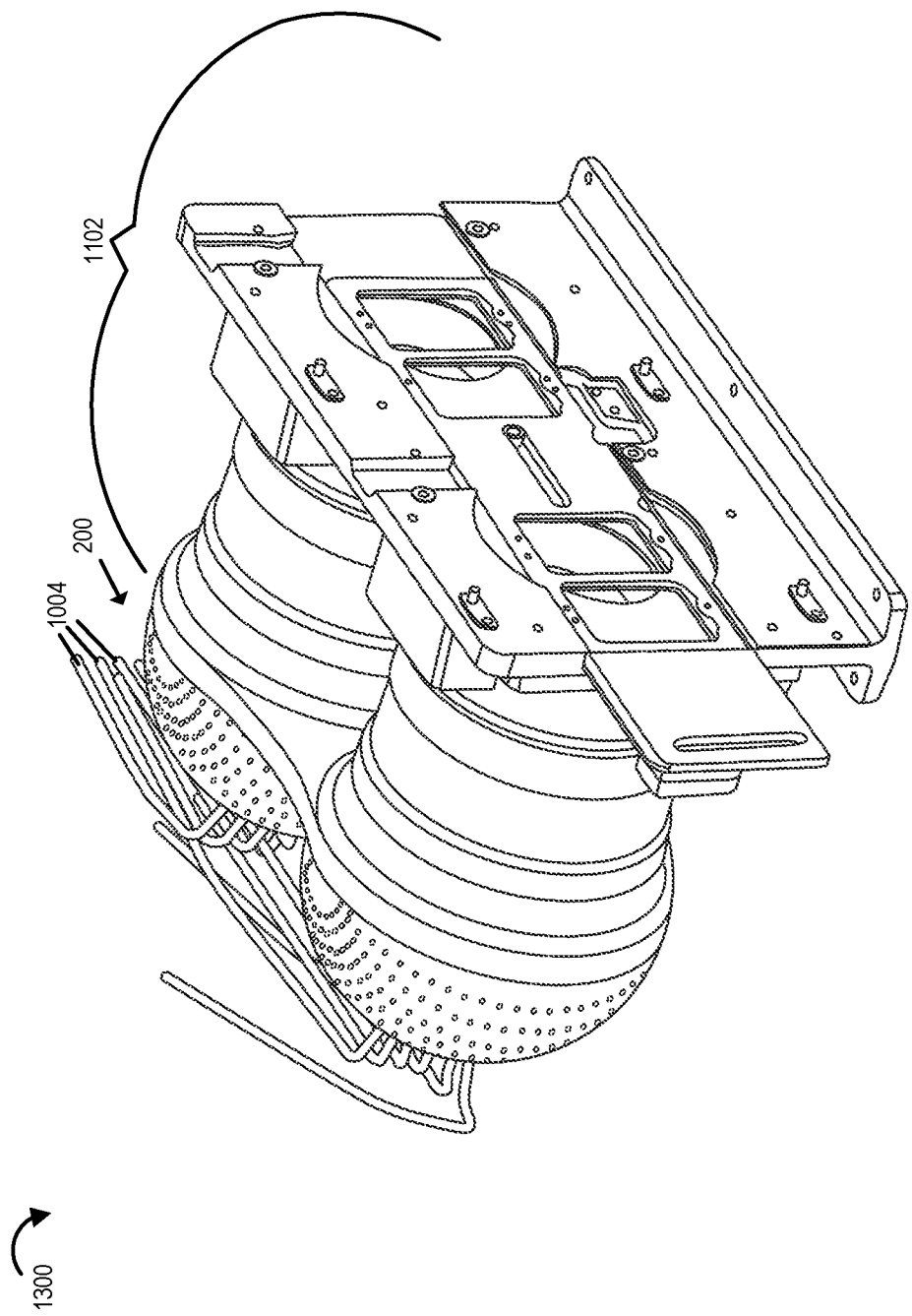
FIG. 13 shows another perspective view of the assembly, e.g., the camera bra placed over the lenses of the stereoscopic camera pair, shown in FIGS. 11 and 12.

FIG. 13 is a drawing 1300 which shows another perspective view of the camera lens and sensor mounting assembly 1102 without mounted sensors, with the camera bra 200 placed over the lenses of the cameras, shown in FIGS. 11 and 12.

Figure 14:
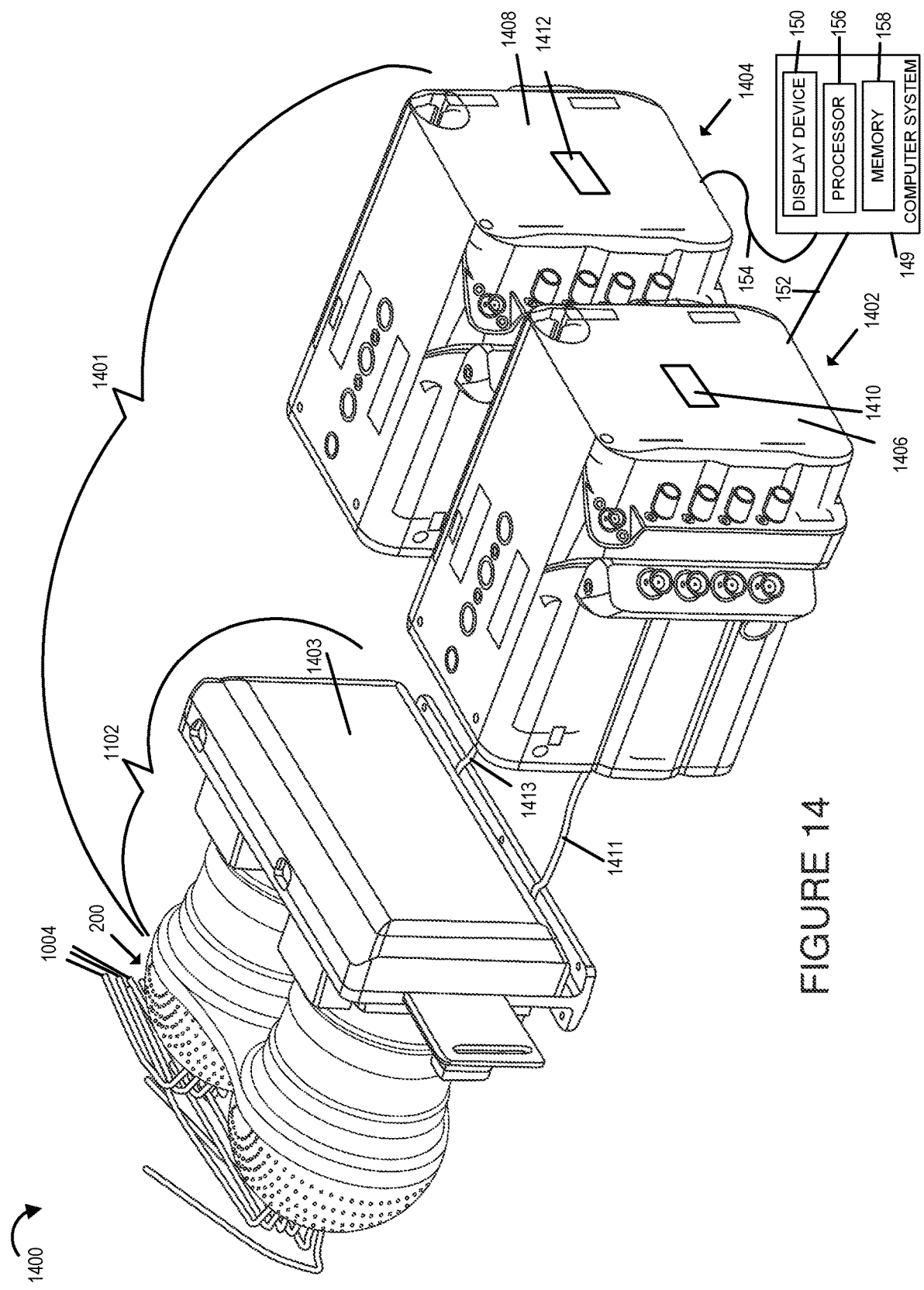
FIG. 14 shows an embodiment in which the camera calibration bra is used for calibrating a stereoscopic camera pair in which the camera bodies are separate from the lens and sensor assemblies and coupled to the lens and sensor assemblies of the camera pair via cables allowing for a variety of mounting arrangements since the camera bodies with the camera processors are not rigidly fixed to the lens assemblies.

FIG. 14 is a drawing 1400 which shows an embodiment in which the camera calibration bra 200 including light emitting fibers 1004 is used for calibrating a stereoscopic camera device 1401 including a stereoscopic camera pair 1402, 1404. In stereoscopic camera device 1401 the camera bodies (1406, 1408) including processors (1410, 1412), are separate from the lens and sensor mounting assembly 1102 and coupled to the lens and sensor assembly 1102 of the camera pair via cables (1411, 1413) allowing for a variety of mounting arrangements since the camera bodies (1406, 1408) with the camera processors (1410, 1412) are not rigidly fixed to the lens assemblies. Processor 1410 of first camera 1402 is connected to first camera sensor 1501 via cable 1411. Processor 1412 of second camera 1404 is connected to second camera sensor 1503 via cable 1413. Back cover 1403 of camera lens and sensor mounting assembly 1102 can be seen in FIG. 14.

FIG. 14 further illustrates a computer system 149 including a display device 150, a processor 154, e.g., a CPU, and memory 156, coupled to the camera pair (1402, 1404), via cables (152, 154), respectively. Display device 150 displays captured images using the first camera 1402 of the stereoscopic camera pair while a calibration bra 200 is placed over the lenses (302, 304) of the stereoscopic camera pair (1402, 1404) along with an alignment target. The position of at least a portion of the first camera 1402 is adjusted to align one or more captured calibration marks captured by the first camera 1402 with the alignment target. In some embodiments, the portion of the first camera which is adjusted is within lens and sensor mounting assembly 1102 and corresponds to the first camera's lens assembly and/or the first camera's sensor mount. Display device 150 also displays captured images using the second camera 1404 of the stereoscopic camera pair while a calibration bra 200 is placed over the lenses (302, 304) of the stereoscopic camera pair (1402, 1404) along with an alignment target. The position of at least a portion of the second camera 1404 is adjusted to align one or more captured calibration marks captured by the second camera 1404 with the alignment target. In some embodiments, the portion of the second camera which is adjusted is within lens and sensor mounting assembly 1102 and corresponds to the second camera's lens assembly and/or the sensor camera's sensor mount. In various embodiments, display device 150 displays an image captured by the second camera device 1404 over an image captured by the first camera device 1402, as part of a calibration method.

Figure 15:
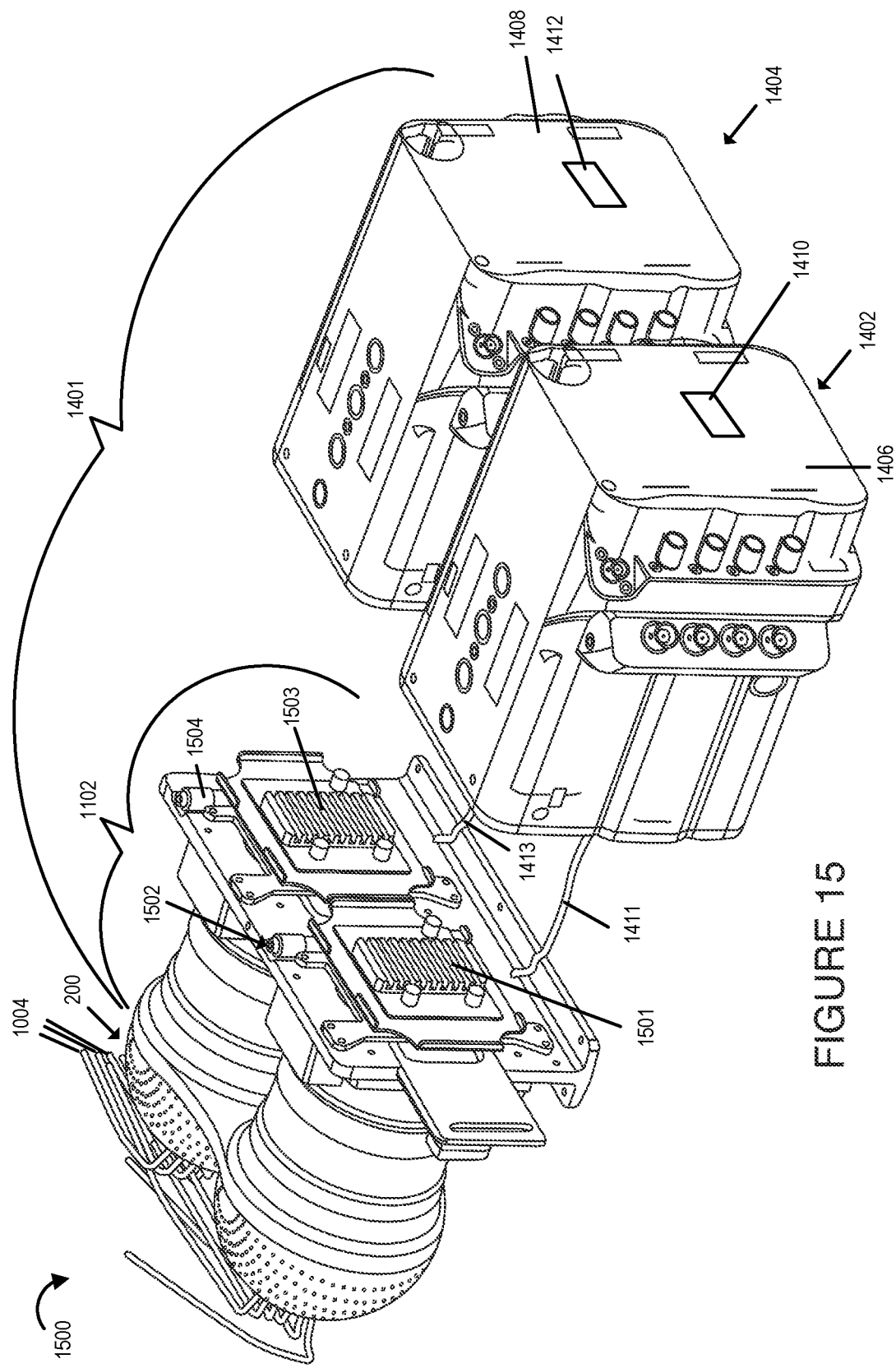
FIG. 15 shows the camera and camera bra assembly of FIG. 14 but with the cover removed from the back of the sensor mount assembly so that the location of the sensors can be seen.

FIG. 15 is a drawing 1500 which shows the camera device 1401 and installed camera bra assembly 200 with optical fibers 1004 of FIG. 14, but with the cover 1403 removed from the back of the camera lens and sensor mounting assembly 1102 so that the location of the sensors (1501, 1503) can be seen. Sensor position adjustment screw 1502 can be moved to reposition, e.g., adjust, sensor 1501 location. Sensor position adjustment screw 1504 can be moved to reposition, e.g., adjust, sensor 1503 location.

Figure 16:
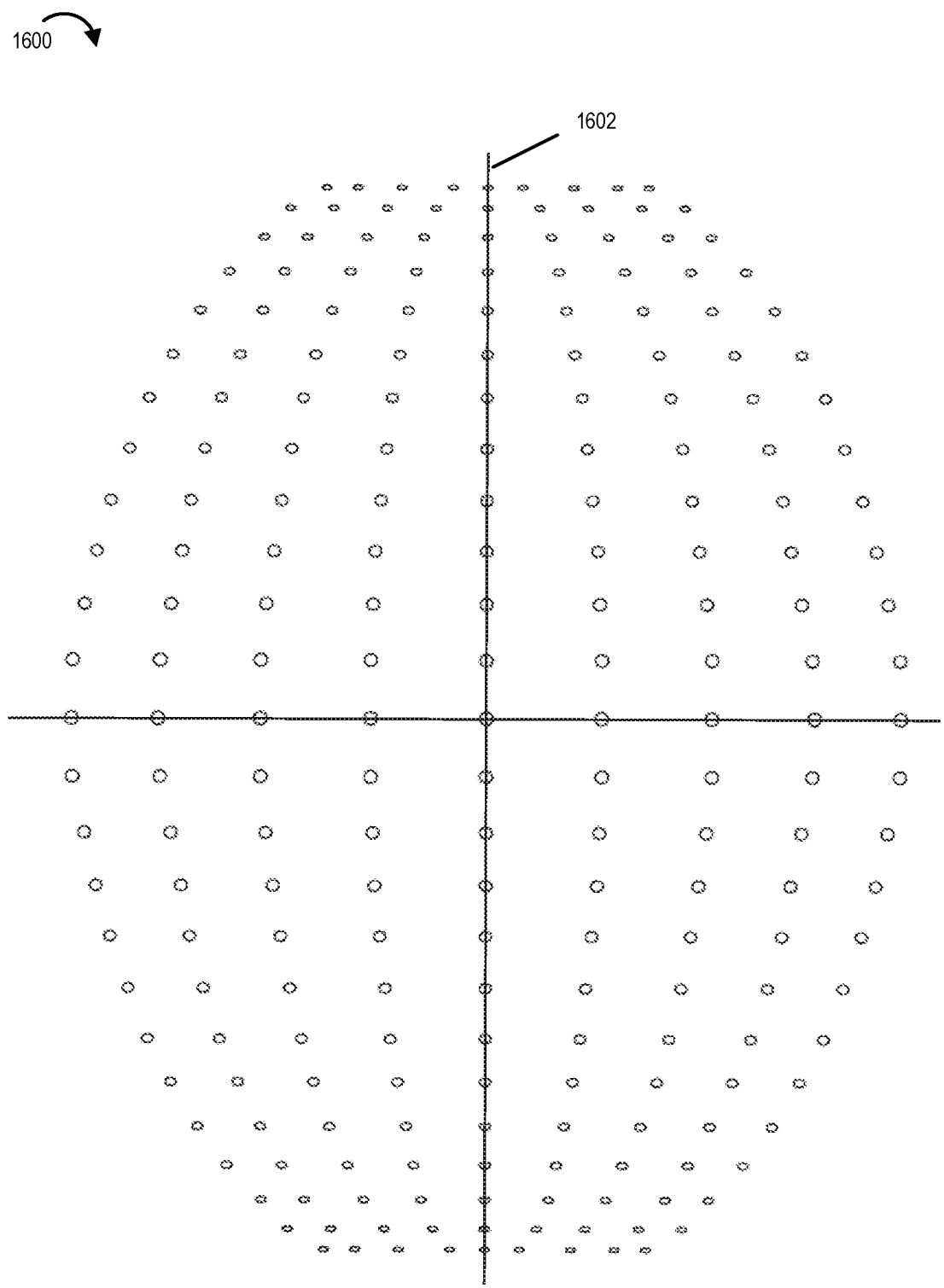
FIG. 16 shows an exemplary image of exemplary test pattern which may be viewed from inside one of the domes of the calibration device along with an exemplary alignment pattern, in the form of a cross that can be displayed on a display with the exemplary test pattern.

FIG. 16 shows an exemplary image of exemplary test pattern which may be viewed from inside one of the domes of the calibration device along with an exemplary alignment pattern, in the form of a cross that can be displayed on a display with the exemplary test pattern.

Figure 17:
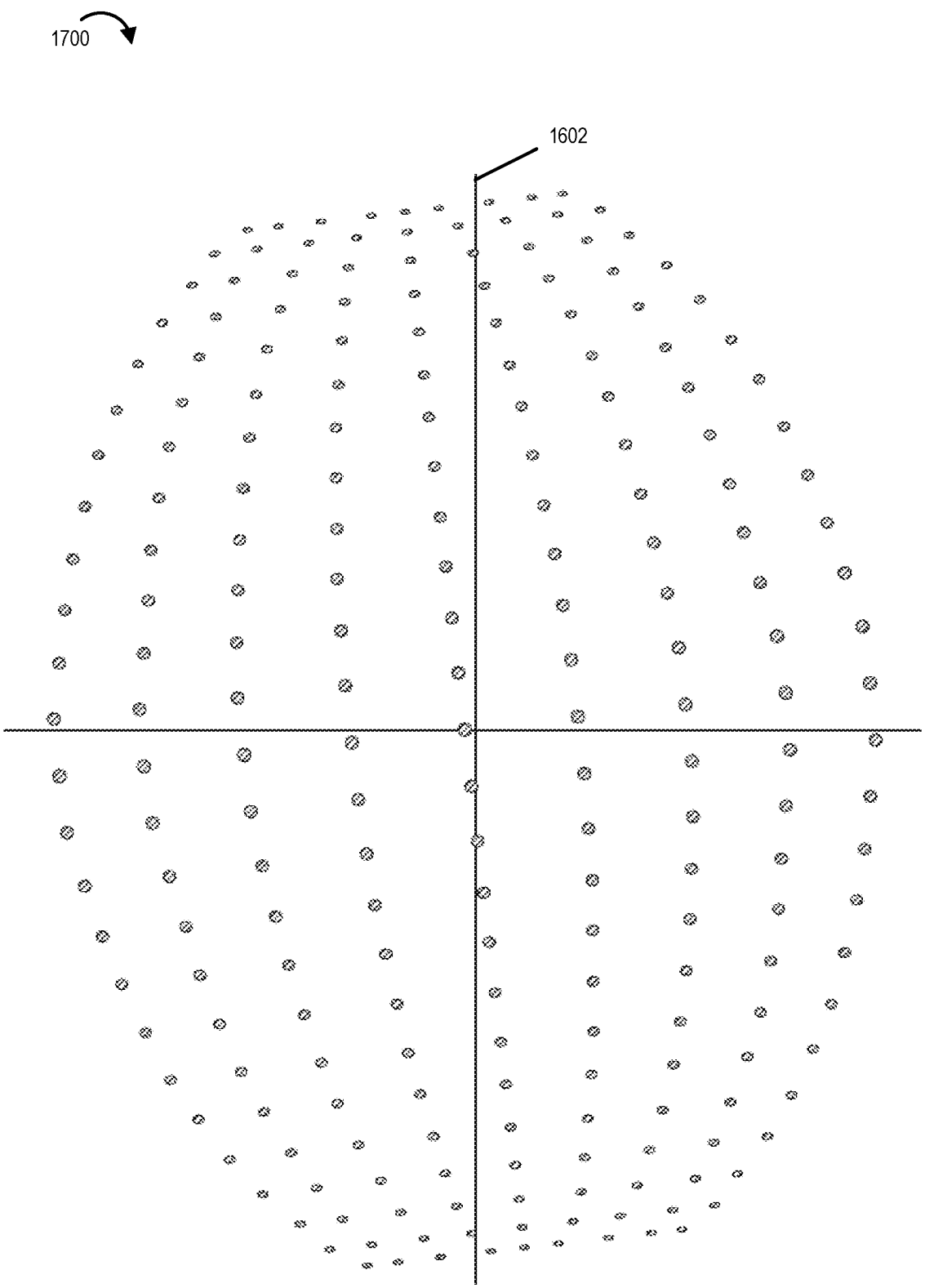
FIG. 17 shows an exemplary image of the inside of a first dome of the calibration device by a left camera assembly of a stereoscopic pair, e.g., after shipment of the stereoscopic camera pair, and prior to calibration and/or alignment using the calibration tool of the present invention superimposed on alignment pattern.

FIG. 17 shows an exemplary image of the inside of a first dome of the calibration device by a left camera assembly of a stereoscopic pair, e.g., after shipment of the stereoscopic camera pair, and prior to calibration and/or alignment using the calibration tool of the present invention superimposed on alignment pattern 1602.

Figure 18:
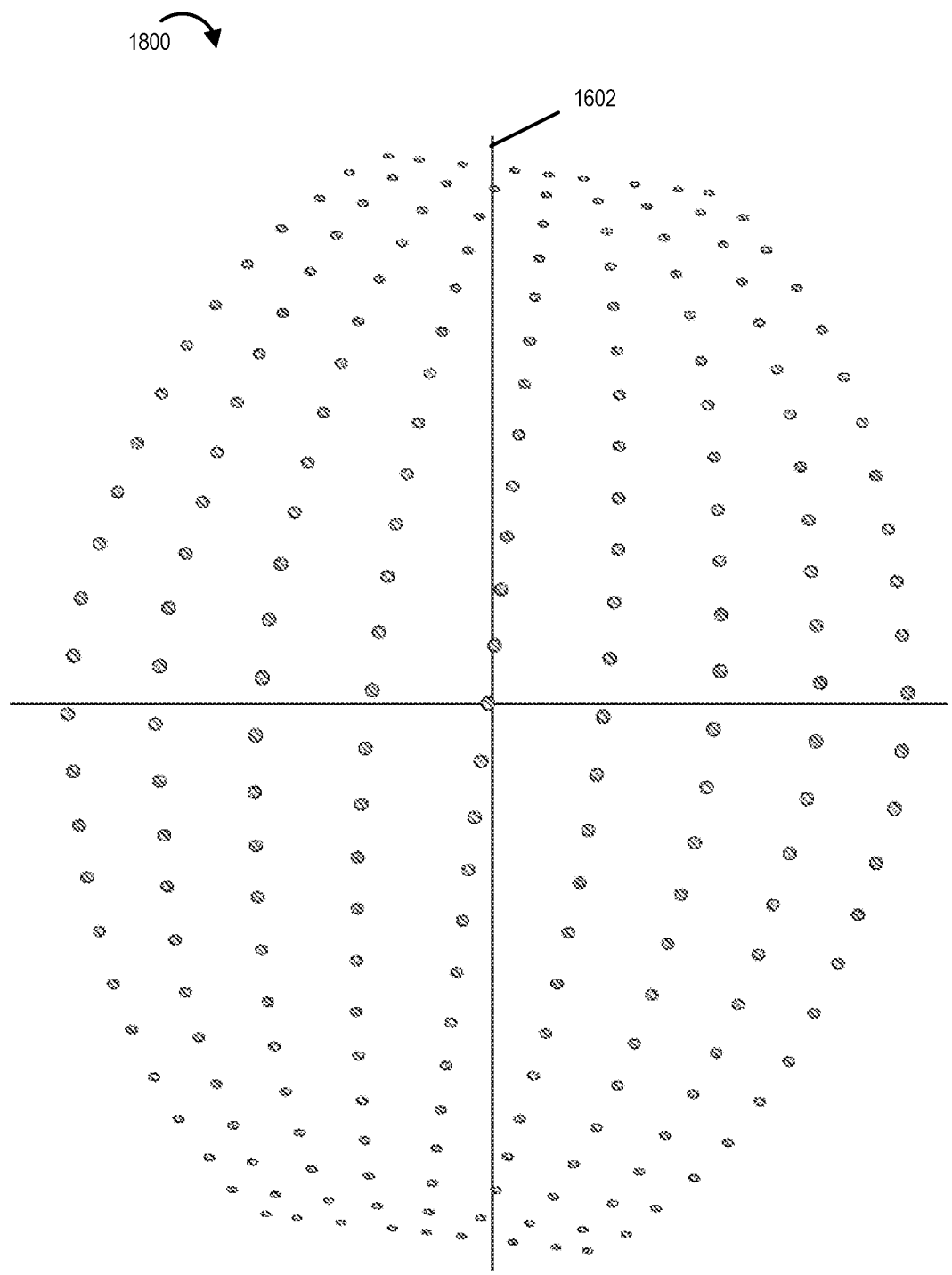
FIG. 18 shows an exemplary image of the inside of a second dome of the calibration device by a right camera assembly of the stereoscopic pair, e.g., after shipment of the stereoscopic camera pair, and prior to calibration and/or alignment using the calibration tool of the present invention superimposed on alignment pattern.

FIG. 18 shows an exemplary image of the inside of a second dome of the calibration device by a right camera assembly of the stereoscopic pair, e.g., after shipment of the stereoscopic camera pair, and prior to calibration and/or alignment using the calibration tool of the present invention superimposed on alignment pattern 1602.

Figure 19:
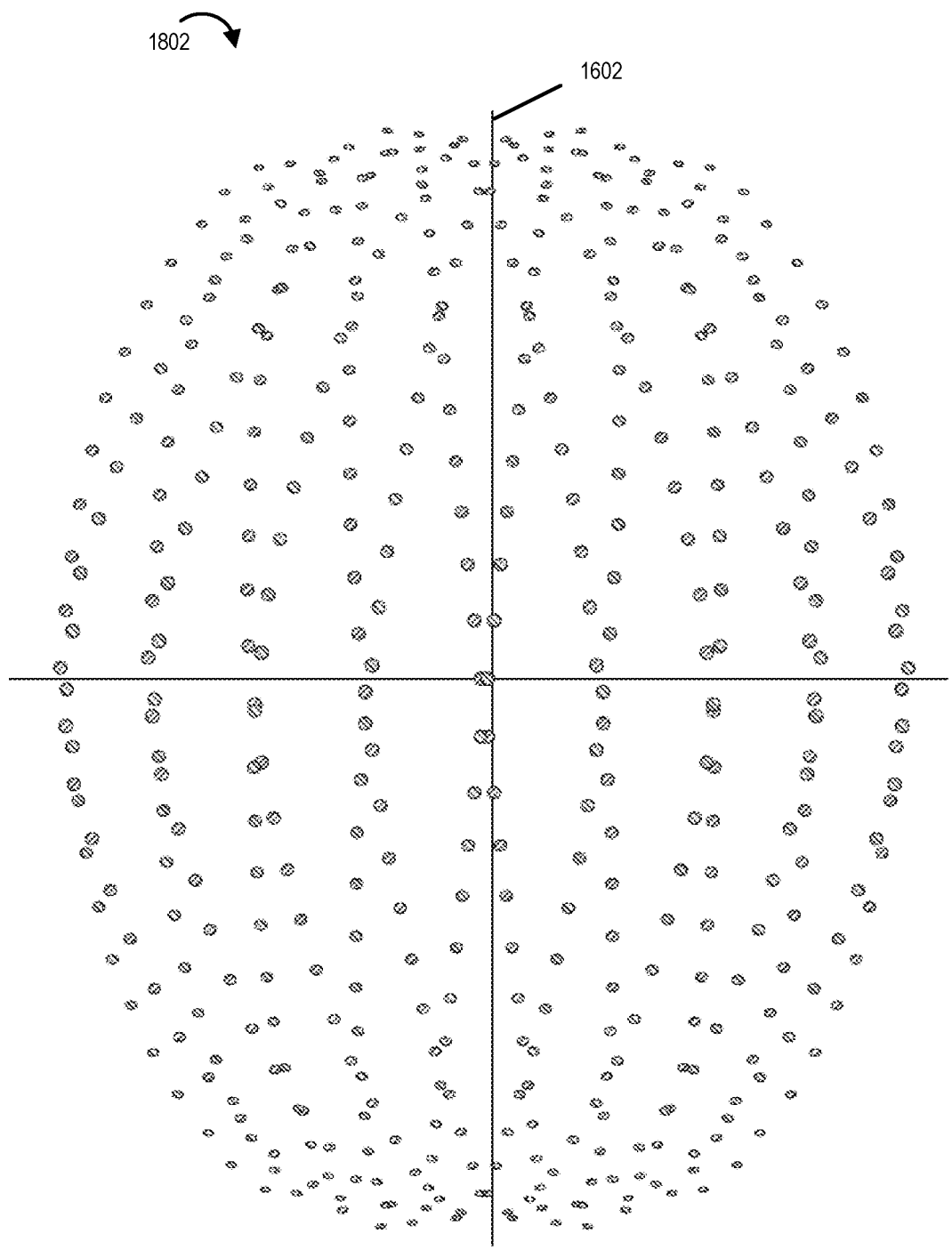
FIG. 19 shows the images of FIGS. 17 and 18 being superimposed with the miss-alignment resulting in the displayed test patterns of the left and right domes of the calibration tool being miss-aligned.

FIG. 19 shows the images of FIGS. 17 and 18 being superimposed with the miss-alignment resulting in the displayed test patterns of the left and right domes of the calibration tool being miss-aligned.

Figure 20:
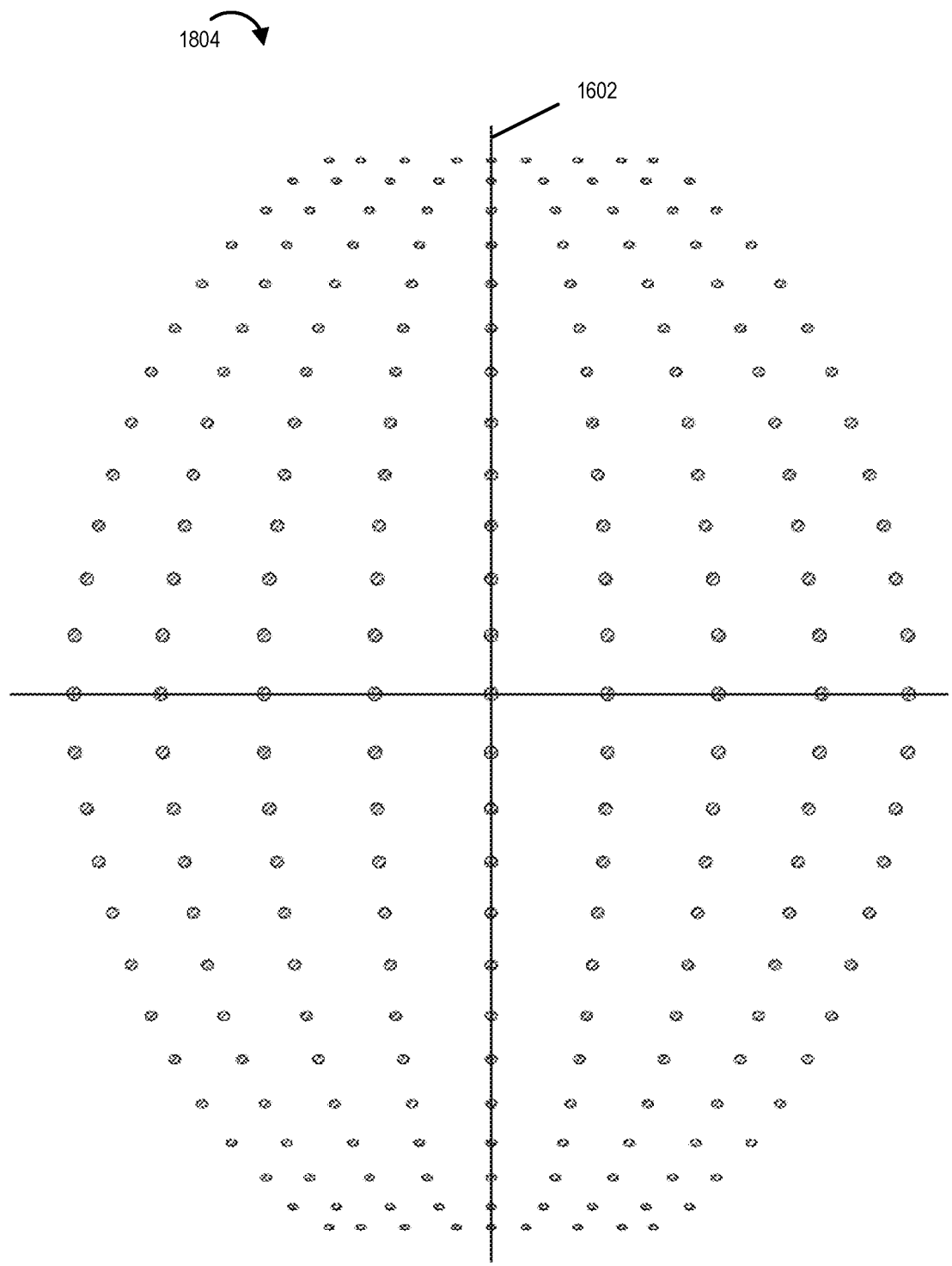
FIG. 20 shows an image captured by the left camera assembly of the exemplary stereoscopic camera pair after alignment of the left camera assembly using the camera alignment device of the present invention superimposed on alignment pattern.

FIG. 20 shows an image captured by the left camera assembly of the exemplary stereoscopic camera pair after alignment of the left camera assembly using the camera alignment device of the present invention superimposed on alignment pattern 1602.

Figure 21:
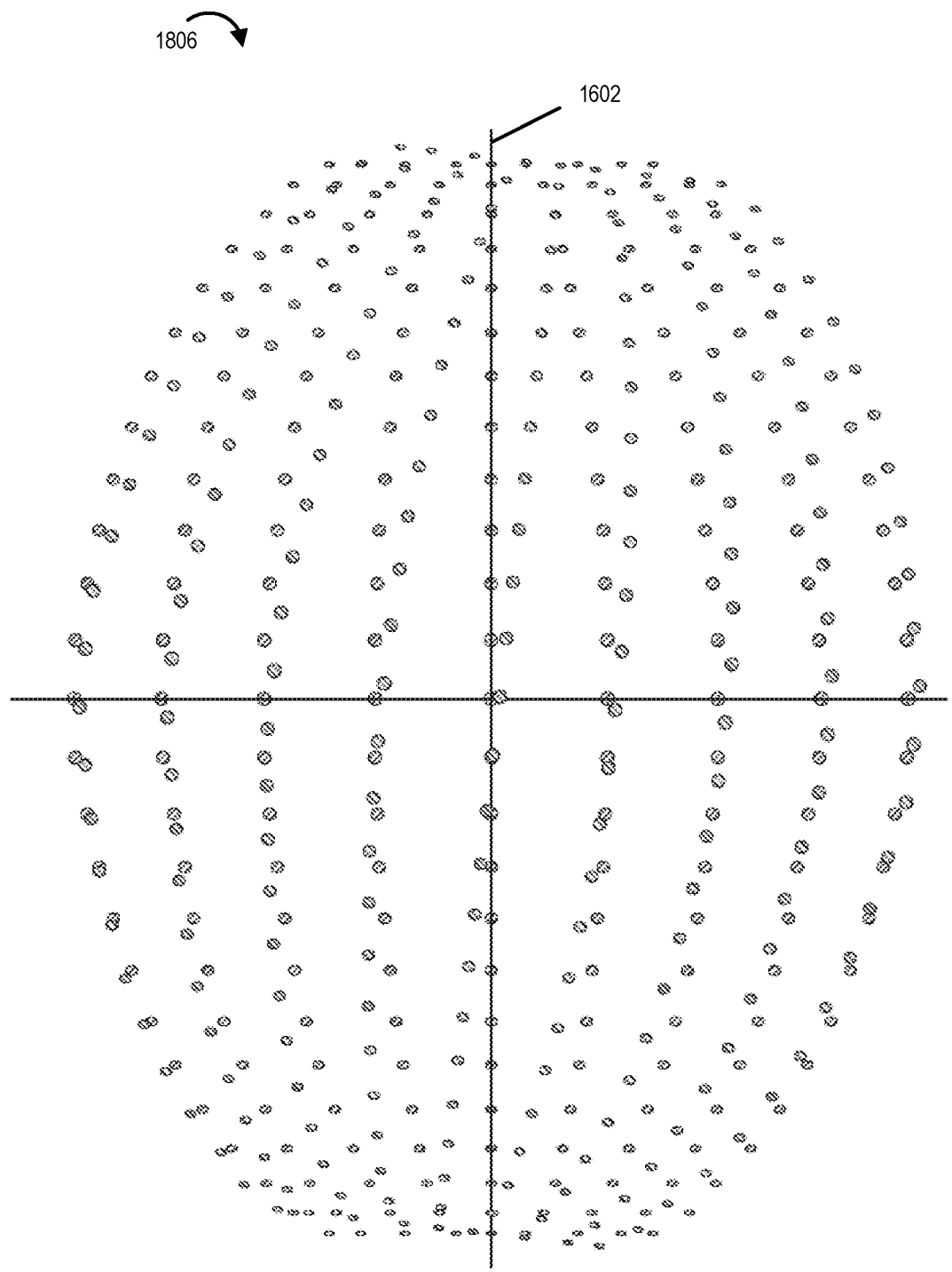
FIG. 21 shows an image captured by the left camera of the exemplary stereoscopic following calibration/alignment with an image of the second dome of the calibration device captured by the right camera assembly prior to alignment/calibration of the right camera assembly using the calibration device of the present invention superimposed on alignment pattern.

FIG. 21 shows an image captured by the left camera of the exemplary stereoscopic following calibration/alignment with an image of the second dome of the calibration device captured by the right camera assembly prior to alignment/calibration of the right camera assembly using the calibration device of the present invention superimposed on alignment pattern 1602.

Figure 22:
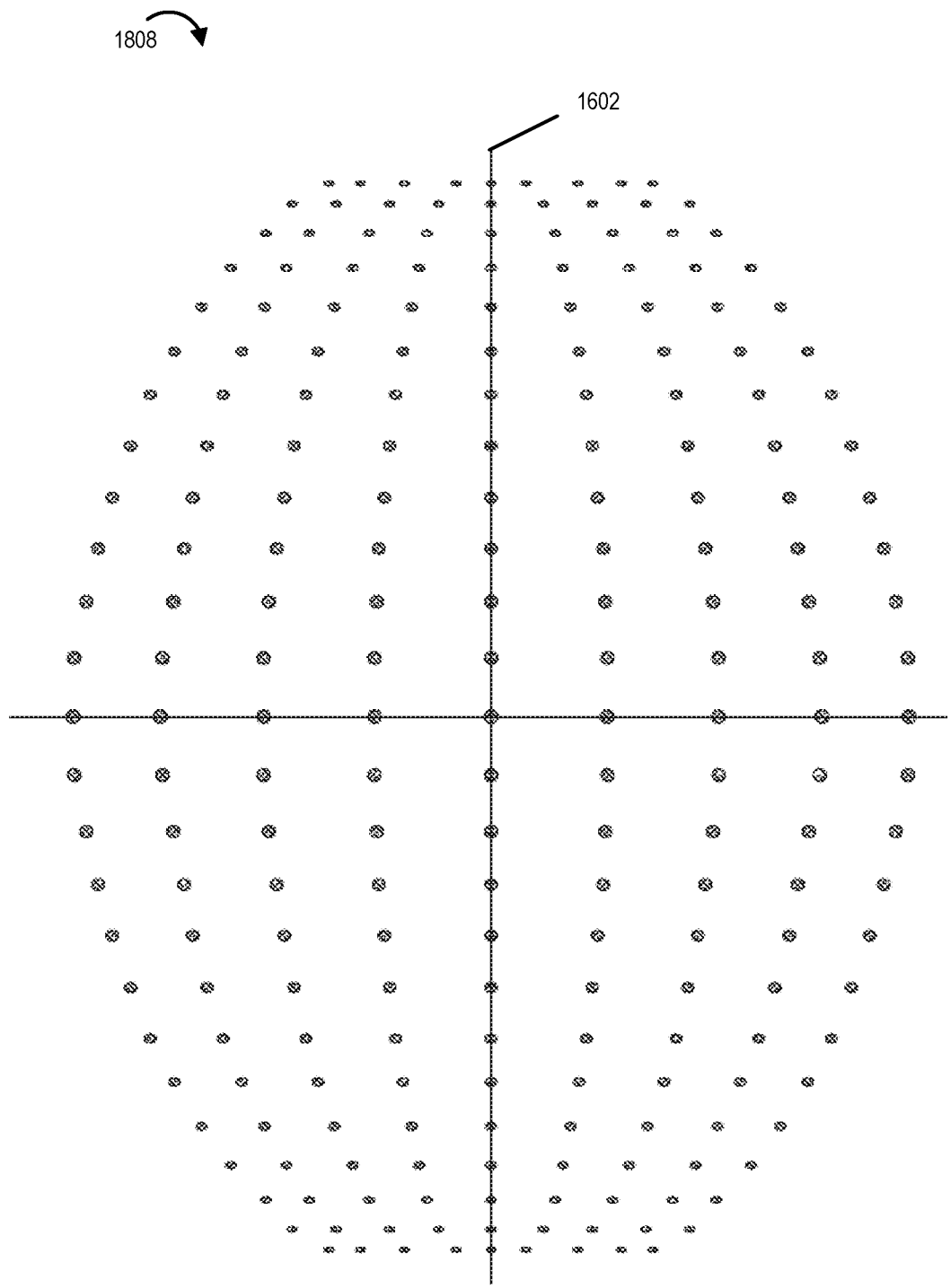
FIG. 22 shows an image of the first dome of the calibration device captured by the left camera assembly of the exemplary stereoscopic camera pair following calibration/alignment of the left camera assembly superimposed with i) an image of the second dome of the calibration device captured by the right camera assembly of the exemplary stereoscopic camera pair and ii) alignment pattern following calibration/alignment of both the left and right camera assemblies to achieve proper camera component alignment and spacing between camera assemblies.

FIG. 22 shows an image of the first dome of the calibration device captured by the left camera assembly of the exemplary stereoscopic camera pair following calibration/alignment of the left camera assembly superimposed with i) an image of the second dome of the calibration device captured by the right camera assembly of the exemplary stereoscopic camera pair and ii) alignment pattern 1602 following calibration/alignment of both the left and right camera assemblies to achieve proper camera component alignment and spacing between camera assemblies.

Figure 23A:
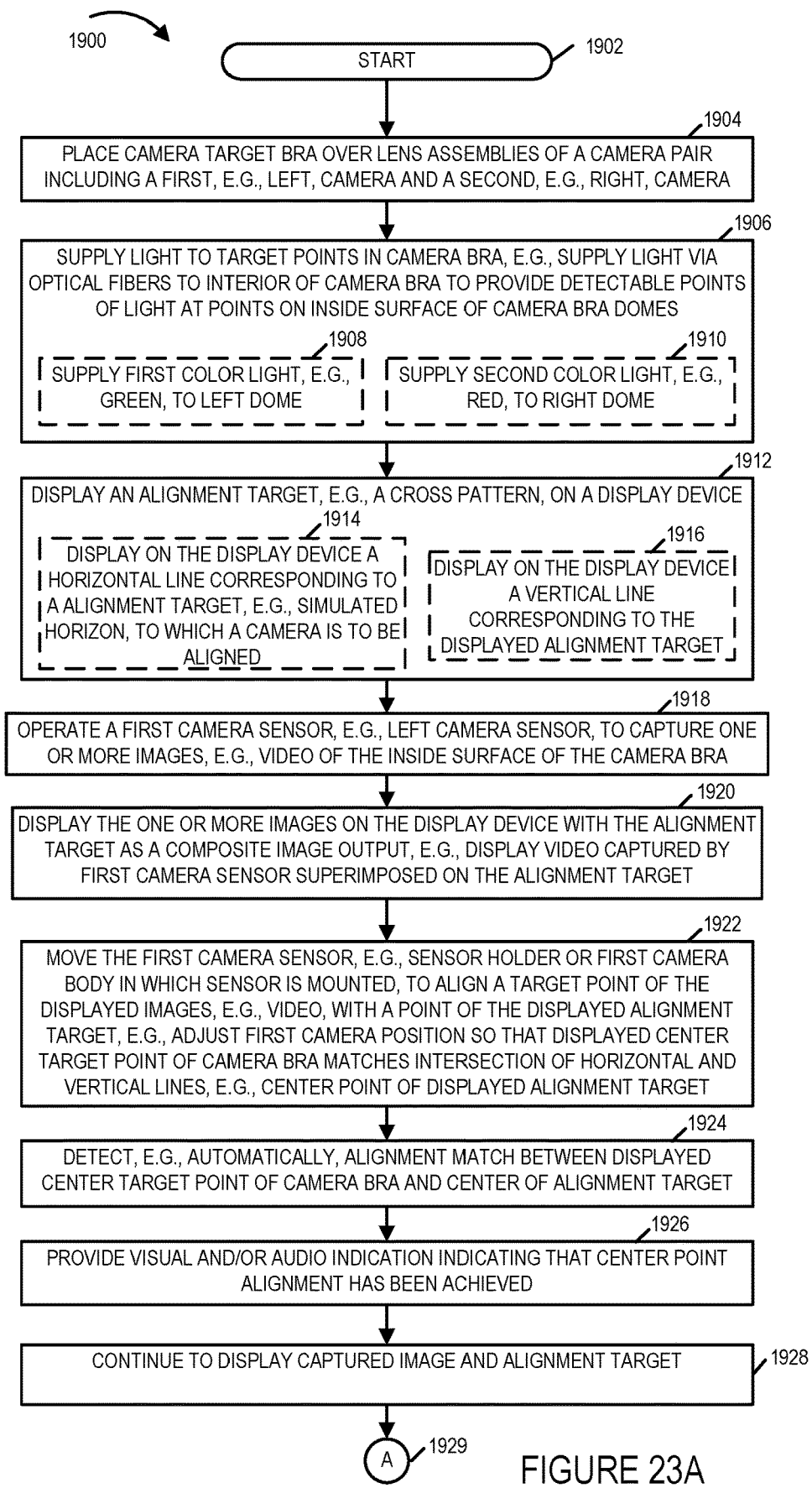
FIG. 23A is a first part of a flowchart illustrating the steps of an exemplary method of camera alignment in accordance with an exemplary embodiment.
Figure 23B:
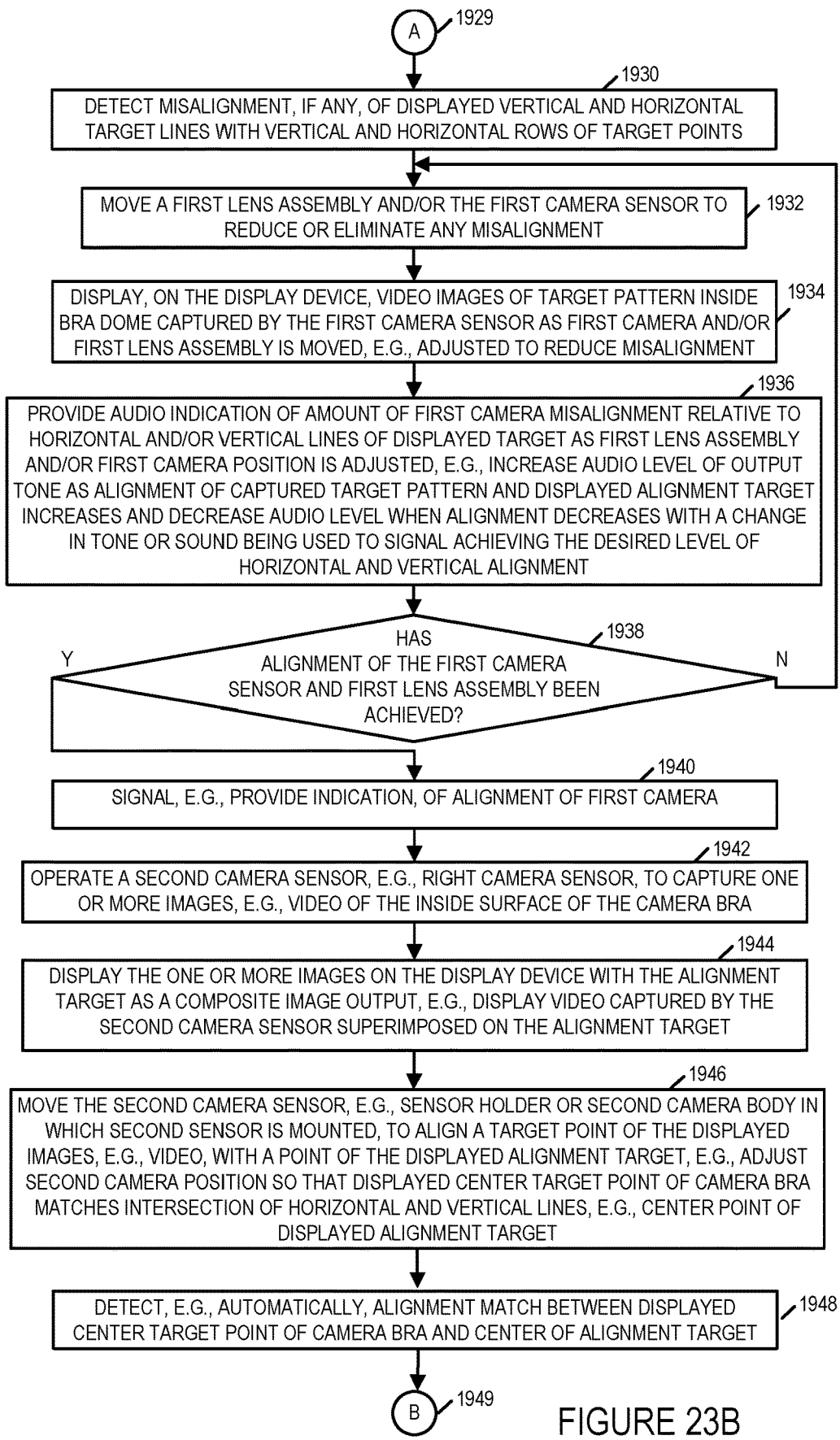
FIG. 23B is a second part of the flowchart illustrating the steps of the exemplary method of camera alignment in accordance with an exemplary embodiment.
Figures 23, 23C:
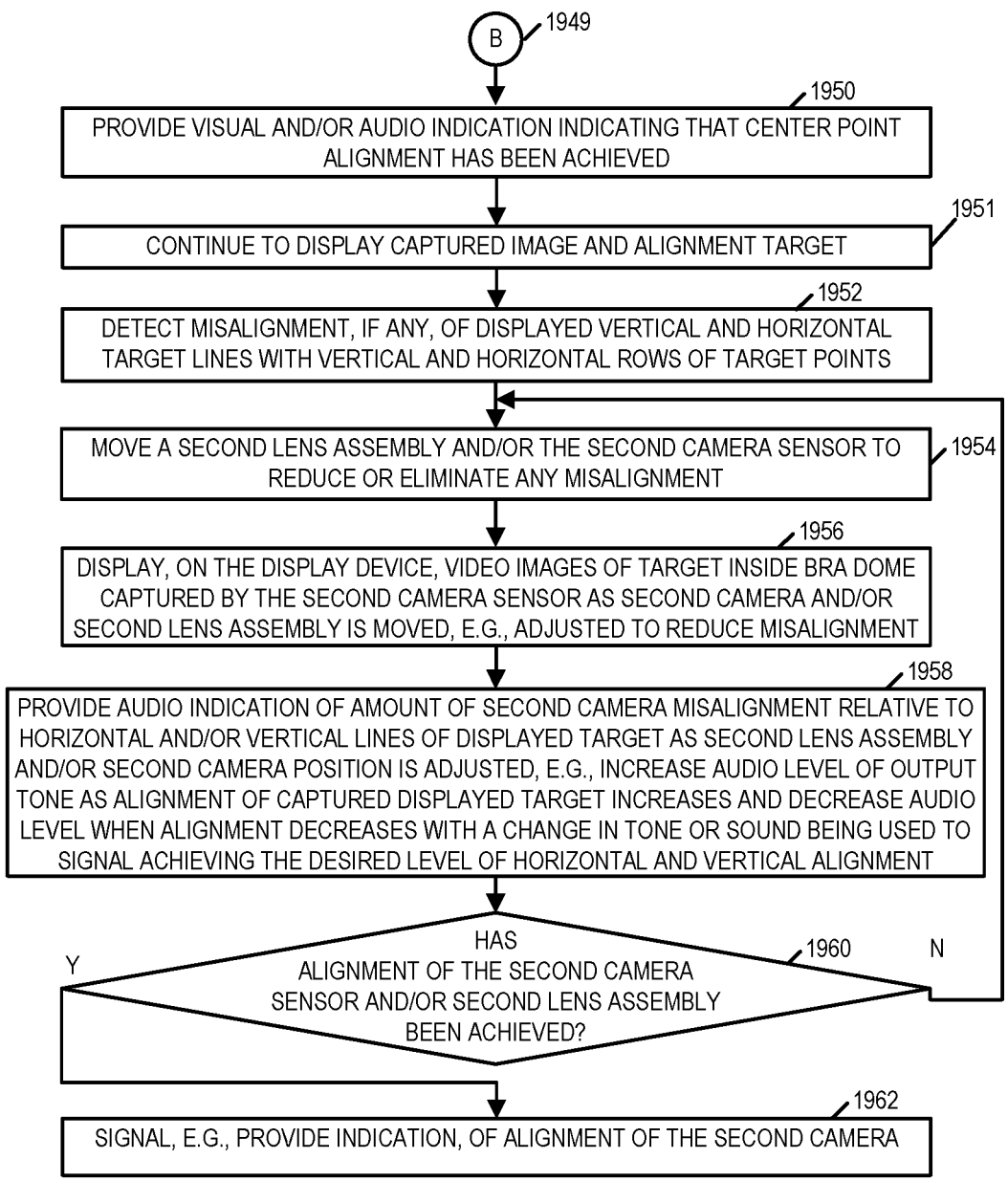
FIG. 23C is a third part of the flowchart illustrating the steps of the exemplary method of camera alignment in accordance with an exemplary embodiment.
FIG. 23 comprises the combination of FIG. 23A, FIG. 23B and FIG. 23C.

FIG. 23, which comprises the combination of FIG. 23A, FIG. 23B, and FIG. 23C, shows a method implemented in accordance with the invention and which involves use of the camera bra, a display and various other hardware devices used to align the cameras of a stereoscopic camera pair.

FIG. 23, comprising the combination of FIG. 23A, FIG. 23B and FIG. 23C, is a flowchart 1900 illustrating the steps of an exemplary method of camera alignment using the exemplary camera bra 200 of the present invention in accordance with one embodiment. The exemplary method starts in step 1902 and proceeds to step 1904. In step 1904 the camera bra is placed over the lens assemblies of a camera pair including a first, e.g., left, camera and a second, e.g., right, camera. As discussed earlier the camera bra can be secured to the lens assemblies of the camera simply by pressure/friction fitting the camera bra onto the lens assemblies of the left and right cameras.

Operation proceeds from step 1904 to step 1906 where light is supplied to the target points in the camera bra, e.g., on the inside surface of the camera bra, by optical fibers connected to the holes on corresponding locations on the outer surface of the bra. Thus in some embodiments in step 1906 light is supplied via optical fibers to interior of the camera bra to provide detectable points of light on the inside surface of the camera bra domes. In some embodiments steps 1908 and 1910 are implemented as part of step 1906. In step 1908 a first color light, e.g., green colored light, is supplied to the left dome of the camera bra and in step 1910 a second color light, e.g., red colored light, is supplied to the right dome of the camera bra.

Operation proceeds from step 1906 to step 1912. In step 1912 an alignment target, e.g., a cross pattern similar to a sniper crosshair, to which the camera is to be aligned is displayed on a display device. In some embodiments as part of implementing step 1912, steps 1914 and 1916 are performed where in step 1914 a horizontal line corresponding to the alignment target, e.g., a simulated horizon, to which the camera is to be aligned, is displayed on the display device. In step 1916 a vertical line corresponding to the alignment target is displayed on the display device, e.g., with the displayed horizontal and vertical lines together representing a crosshair alignment target.

Operation proceeds from step 1912 to step 1918. In step 1918 a first camera sensor of the camera pair, e.g., left camera sensor, is operated to capture one or more images, e.g., video, of the inside surface of the camera bra which has been secured to the camera lens. Recall that the inside surface of the camera bra provides a pattern formed by points of light which is supplied via optical fibers connected to the holes at corresponding locations on the camera bra. Thus on the inside surface the illuminated light points form a pattern which can be captured by the camera. Operation proceeds from step 1918 to step 1920. In step 1920 the one or more captured images are displayed on the display device with the alignment target as a composite image output, e.g., video captured by the first camera sensor is displayed superimposed on the alignment target.

Operation proceeds from step 1920 to step 1922. In step 1922 the first camera sensor, e.g., sensor holder or first camera body on which the sensor is mounted, is moved to align a target point of the displayed images, e.g., video, with a point of the displayed alignment target, e.g., the first camera position is adjusted so that displayed center target point of the camera bra matches intersection point of horizontal and vertical lines, e.g., center point of the displayed alignment target. In some embodiments, in step 1922 the position of at least a portion of the first camera is adjusted to align one or more captured calibration marks captured by the first camera with the alignment target. In some embodiments, the captured calibration marks are points of light corresponding to holes in a first dome of the calibration bra. Operation proceeds from step 1922 to step 1924. In step 1924 the alignment match between displayed center target point of the camera bra and center of the alignment target is detected, e.g., automatically. Thus as the camera is adjusted, e.g., sensor moved and/or positioned to align the center points displayed crosshair target and the displayed image of captured pattern from the inside surface of camera bra, the alignment match is monitored and detected when a match is achieved. Operation proceeds to step 1926 where a visual and/or audio indication is provided indicating, e.g., to an operator, that center point alignment has been achieved. Operation proceeds from step 1926 to step 1928 where it is indicated that the display of captured pattern image and the alignment target on the display device is continued.

Operation proceeds from step 1928 to step 1930 via connecting node A 1929. In step 1930 misalignment, if any, of displayed vertical line and horizontal target lines of the displayed alignment target with vertical and horizontal rows of target (light) points of the displayed image is detected, e.g., determined. For proper alignment the displayed alignment target's vertical and horizontal line should be aligned with vertical and horizontal rows of target (light) points of the displayed image of the pattern on the inside surface of the camera bra dome. Operation proceeds from step 1930 to step 1932. In step 1932 the first camera sensor and/or a first lens assembly corresponding to the first camera is moved to reduce or eliminate any misalignment, e.g., by adjusting the lens tilt angle and/or by adjusting the camera sensor mount. Operation proceeds from step 1932 to step 1934. In step 1934 the video images of target pattern inside the camera bra dome captured by the first camera sensor as the first camera and/or the first lens assembly is moved, e.g., adjusted to reduce misalignment, are displayed on the display device.

Operation proceeds from step 1934 to step 1936. In step 1936 the audio indication of amount of first camera misalignment relative to the horizontal and vertical lines of the displayed alignment target is provided as the first lens assembly and/or first camera position is adjusted. For example in some embodiments audio level of output tone is increased as alignment of the displayed captured target pattern image and the alignment target increases while audio level is decreased when the alignment decreases, with a change in tone or sound being used to signal achieving the desired level of horizontal and vertical alignment.

Operation proceeds from step 1936 to step 1938 where it is determined if the desired alignment of the first camera sensor and the first lens assembly has been achieved. If the alignment has been achieved the operation proceeds to step 1940 otherwise the operation proceeds back to step 1932 and one or more of the steps 1932, 1934 and 1936 are repeated until the desired alignment is achieved. In step 1940, having achieved the desired alignment, a signal, e.g., an indication such as an audible tone or other human perceptible indication, is provided to indicate that alignment of the first camera has been achieved. Operation proceeds from step 1940 to step 1942.

In step 1942 a second camera sensor of the camera pair, e.g., right camera sensor, is operated to capture one or more images, e.g., video, of the inside surface of the camera bra which has been secured to the camera lens. Recall that the inside surface of the camera bra provides a pattern formed by points of light which is supplied via optical fibers connected to the holes at corresponding locations on the camera bra. Thus on the inside surface the illuminated light points form a pattern which can be captured by the camera. Operation proceeds from step 1942 to step 1944. In step 1944 the one or more captured images are displayed on the display device with the alignment target as a composite image output, e.g., video captured by the second camera sensor is displayed superimposed on the alignment target.

Operation proceeds from step 1944 to step 1946. In step 1946 the second camera sensor, e.g., sensor holder or second camera body on which the sensor is mounted, is moved to align a target point of the displayed images, e.g., video, with a point of the displayed alignment target, e.g., the second camera sensor position is adjusted so that displayed center target point of the camera bra matches intersection point of horizontal and vertical lines, e.g., center point of the displayed alignment target. Operation proceeds from step 1946 to step 1948. In step 1948 the alignment match between displayed center target point of the camera bra and center of the alignment target is detected, e.g., automatically. Thus as the second camera is adjusted, e.g., second sensor moved and/or positioned to align the center points displayed crosshair target and the displayed image of captured pattern from the inside surface of camera bra, the alignment match is monitored and detected when a match is achieved. Operation proceeds from step 1948 via connecting node B 1949 to step 1950. In step 1950 a visual and/or audio indication is provided indicating, e.g., to an operator, that center point alignment has been achieved. Operation proceeds from step 1950 to step 1951 where it is indicated that the display of captured target pattern image and the alignment target on the display device is continued. Operation proceeds from step 1951 to step 1952.

In step 1952 misalignment, if any, of displayed vertical line and horizontal target lines of the displayed alignment target with vertical and horizontal rows of target (light) points of the displayed image is detected, e.g., determined. For proper alignment the displayed alignment target's vertical and horizontal line should be aligned with vertical and horizontal rows of target (light) points of the displayed image of the pattern on the inside surface of the camera bra dome. Operation proceeds from step 1952 to step 1954. In step 1954 the second camera sensor and/or a second lens assembly corresponding to the second camera is moved to reduce or eliminate any misalignment, e.g., by adjusting the lens tilt angle and/or by adjusting the camera sensor mount. Operation proceeds from step 1954 to step 1956. In step 1956 the video images of target pattern inside the camera bra dome captured by the second camera sensor as the second camera and/or the second lens assembly is moved, e.g., adjusted to reduce misalignment, are displayed on the display device. In some embodiments, step 1956 includes superimposing an image captured by the second camera sensor over an image captured by the first camera sensor.

Operation proceeds from step 1956 to step 1958. In step 1958 the audio indication of amount of first camera misalignment relative to the horizontal and vertical lines of the displayed alignment target is provided as the second lens assembly and/or second camera position is adjusted. For example in some embodiments audio level of output tone is increased as alignment of the displayed captured target pattern image and the alignment target increases while audio level is decreased when the alignment decreases, with a change in tone or sound being used to signal achieving the desired level of horizontal and vertical alignment.

Operation proceeds from step 1958 to step 1960 where it is determined if the desired alignment of the second camera sensor and the second lens assembly has been achieved. If the alignment has been achieved the operation proceeds to step 1962; otherwise, the operation proceeds back to step 1954 and one or more of the steps 1954, 1956 and 1958 are repeated until the desired alignment is achieved. In step 1962, having achieved the desired alignment, a signal, e.g., an indication such as an audible tone or other human perceptible indication, is provided to indicate that alignment of the second camera has been achieved.

Methods and apparatus for aligning cameras of a camera pair are described. The methods and apparatus are well suited for aligning pairs of a stereoscopic pair to achieve reliable camera spacing and orientation of cameras of a stereoscopic pair.

FIG. 1 illustrates the components of a stereoscopic camera pair (102, 104) and a mount which can be used to secure the cameras (102, 104) of the camera pair to a camera rig. In some embodiments during testing and/or calibration the camera bra 200 is placed over the lenses 302, 304 of the cameras shown in FIG. 1. The mount and various plates secured there to allow for various adjustments of the cameras and lenses of the camera pair. Thus by adjusting one or more screws, e.g., 120, 120', 120", 122'. 122', and/or moving one or more of the cameras, the alignment, spacing, tilt and orientation of the individual cameras in the mount can be adjusted with a fine degree of precision. The lenses (302, 304) shown in the FIG. 1 system are fish eye lenses.

A camera device, in some embodiments, includes a camera body, e.g., camera body 103 or camera body 105, in which a sensor is mounted and a lens, e.g., lens 302 or lens 304. In various embodiments a lens and camera device pair are checked for errors using a relatively large calibration grid. In this way a camera device can be calibrated as a unit before installation in a mount to form a stereoscopic camera pair. In some embodiments the large calibration grid, also referred to as a test pattern, is implemented on a half sphere several feet in diameter or in other embodiments on a portion of a rectangular box several feet across. Intersection points in the grid, referred to as vertices, are visible in images captured by the camera device lens pair. As should be appreciated, minor and/or major defects in a fisheye lens of the lens assembly in combination with the lens orientation and spacing with regard to the sensor of the camera may result in distortions being introduced into images captured by the camera.

By capturing one or more images of the large calibration grid and analyzing the images of the camera device, the distortions introduced by a particular camera (e.g., lens/camera device pair) can be detected, e.g., by a calibration system such as a computer system which processes images of the large calibration grid captured by the camera device. The information on the distortions introduced by the camera device are stored, e.g., in a distortion map. Using the known distortion information generated by the calibration process correction information is generated and can be applied to images or portions of images prior to the display or use of one or more of the images as a texture. Alternatively corrections can be built into a texture map used with a particular camera pair.

In accordance with one feature of the invention a camera alignment tool is used to align the cameras of a stereoscopic pair in a camera mount such as the camera mount 110 of FIG. 1 to which two cameras 102, 104 can be secured side by side. The mounting plate may be, and sometimes is, mounted to a flat surface, e.g., mounting plate, of a camera rig to which multiple camera pairs can be secured, e.g., with each of the camera pairs facing in a different direction. The camera rig may be and sometimes is supported by a tripod.

While the calibration of an individual camera device, e.g., lens and camera body including sensor may be and sometimes is implemented using a large calibration grid, the size of the grid, e.g., several feet in diameter or cross section, is normally too large for side by side camera device to be calibrated using two such grids at the same time. Thus, the calibration/lens distortion detection process is usually performed prior to installation of a camera device in the camera pair mount shown in FIG. 1.

The camera bra may be used to facilitate alignment of cameras as part of a camera pair, whether or not a larger calibration grid is used for individual camera calibration prior to mounting of the camera as part of a camera pair.

While the lenses normally include an orientation indicator, not only do the camera lenses of the cameras need to be oriented in the proper direction, e.g., up or down, the orientation of the camera in the camera mount 110 is important.

A tool sometimes referred to as a "camera bra" because of its resemblance to a woman's bra is used as part of an alignment process. The alignment tool, implemented in accordance with one aspect of the invention, is referred to herein at various location as the camera bra, includes test patterns applied to calibration surfaces, e.g., the inside surfaces of each dome of the calibration bra. In some embodiments the calibration surfaces are the inside surfaces of half domes or half spheres with marks or light sources at predetermined locations, e.g., points, which can be used to facilitate camera alignment. In one embodiment the camera bra is made of rigid plastic and includes a hole at the location each calibration point. A fiber optic line is inserted into the hole and a light source supplied to the fiber optic line.

The apex of the domes of the camera bra include a hole corresponding to the intended location of the optical axis of each camera device. In one embodiment additional holes correspond to the locations of the vertices of the large calibration grid used to initially calibrate the camera device. While this is the case in some embodiments, the pattern inside the domes of the camera bra need not be identical to those of the larger test pattern used for the initial calibration of the individual camera.

During use the camera bra is placed over the lenses of the pair of cameras in the camera mount. Light is supplied via the fiber optic lines and appear as points of light, e.g., small points of light, inside the domes of the camera bra. The points of light in some embodiments are located at the positions where the vertices of the larger calibration grid used for initial camera calibration would be located if the larger calibration grid were shrunk to the size of the inside surface of a calibration bra dome.

The cameras are activated and capture images with the calibration bra in place and with light being supplied through the holes. The cameras each capture an image of the calibration target formed by the holes through which light is provided.

In some embodiments each camera is adjusted so that the center of the captured image is aligned to coincide with the center hole in the dome of the calibration bra. Since the calibration bra is rigid, by aligning the center of the images captured by each of the cameras with the center hole of the bra dome captured by the camera, the desired spacing between the left and right cameras can be archived. Further adjustments of the individual camera's position in the camera mount are made, as needed, so that the cameras are oriented in the right direction. The targets on the inside surfaces of the calibration domes having a fixed relationship allow the cameras of the camera pair to be aligned to match the desired fixed relationship between the camera devices.

Furthermore, in embodiments where the calibration grids of the camera bra are scaled down versions of the larger calibration grid used to calibration individual cameras, the cameras can be easily oriented as part of the camera pair in a manner that is consistent with the orientation and original calibration of the camera devices making the defect and/or information about distortions introduced by individual camera devices as a result of the lens and sensor pairing in the camera device relevant to the individual camera devices as mounted in the camera device pair.

In some embodiments the camera bra is made of a printed abs plastic material. The printing of the camera device allows for it to be made to tight tolerances with the grid points being precisely located within each dome and with the dome spacing being accurately aligned. The relatively small size of the camera device allows it to be used in the field and/or at other locations where the alignment of one or more camera pairs may need to be made. For example, the camera bra may be applied to camera pairs after shipment to make sure they are properly aligned and if necessary alignment adjustments can be made in real time in the field, e.g., at a site where an event is to be captured using one or more stereoscopic camera pairs.

The calibration system may include a computer system coupled to the cameras of a stereoscopic pair in addition to a light source which is coupled to the calibration bra by one or more fiber optic cables as shown in FIG. 10. In some embodiments the computer system includes a display or displays. Images captured by the cameras of a camera pair to which the camera bra has been applied, e.g., placed over the camera lenses, are displayed on the display device after being received and stored in the memory of the computer system. As camera adjustments are made, the images captured by the cameras change on the display reflecting the changes in camera orientation. By bringing the grids of shown in the images captured by the first and second cameras of the camera pair into alignment, the desired camera alignment is achieved.

Camera bras may be custom printed for different cameras and/or lenses. In at least some embodiments the camera bra fits snugly over the camera lens and can be held in place by friction. It should be appreciated that will fiber optic lines are not shown inserted into each of the holes of the camera bra this is for purposes of simplifying the diagrams and in practice a fiber optic line would extend into each hole. Also not that the light source may be implemented as two separate light sources of different color with each light source supplying light to the fibers extending into the holes of different domes.

Not that lens adjustments for the camera shown in FIG. 14, in some embodiments, are the same or similar to those shown for the cameras of FIG. 1.

Numerous variations on the above described methods and apparatus are possible and within the scope of the invention.

What is claimed is:

1. A camera calibration tool, comprising:
   a first dome; and
   a second dome, said first and second domes being rigidly attached to each other by an attachment member that secures the first dome to the second dome;
   wherein each of said first and second domes includes a plurality of light emitting elements forming a pattern on the inside surface of said domes; and
   wherein the first and second domes are made of a material which blocks external light from passing through to camera sensors of first and second cameras over which the first and second domes are placed, respectively.

2. The camera calibration tool of claim 1, wherein said grid pattern matches a larger test pattern used for individually calibrating first and second cameras prior to said camera pair calibration tool (200) being placed over said first and second cameras.

3. The camera calibration tool of claim 1, wherein where said light emitting elements are fibers to which a light source supplies light, each fiber passing through a hole in one of said first and second domes.

4. The calibration tool of claim 1, wherein said light source supplies a first color of light to the light emitting elements of the first dome and supplies a second color of light to the light emitting elements of the second dome, said second color of light being different from said first color of light.

5. The camera calibration tool of claim 1,
   wherein said calibration tool is a plastic calibration tool; and
   wherein the attachment member is wider than the distance between the left and right domes and where the spacing between the left and right domes is less than the width of the attachment member.

6. The camera calibration tool of claim 5, wherein the openings at the base of each of said first and second domes are of a size which allows said calibration tool to be placed over the lenses of said first and second cameras and be held in place by friction.

7. The camera calibration tool of claim 1, wherein said tool is a printed plastic tool and where said plastic blocks the transmission of light except though the holes into which fiber optic lines are inserted to supply light at the predetermined points of the pattern, the light supplied at the predetermined points being is visible from inside each dome of the calibration tool while the plastic of each dome blocks other light from passing through the domes.

8. A method of calibrating a stereoscopic camera pair, comprising:
- capturing a first image using a first camera of the stereoscopic camera calibration pair while a calibration bra is placed over the lenses of the stereoscopic camera pair;
- displaying the first image on a display device along with an alignment target;
- adjusting the position of at least a portion of the first camera, to align one or more captured calibration marks captured by the first camera, with the alignment target; and
- wherein the captured calibration marks are points of light corresponding to holes in a first dome of the calibration bra and wherein domes of the calibration bra are made of a material which blocks external light from passing through the domes while the holes allow light to be supplied to serve as calibration marks.

9. The method of claim 8,
- wherein the captured calibration marks are points of light corresponding to holes in a first dome of the calibration bra; and
- wherein the method further comprises:
- capturing a second image using a second camera of the stereoscopic camera calibration pair while the calibration bra is placed over the lenses of the stereoscopic camera pair;
- displaying the second image on the display device along with the alignment target.

10. The method of claim 9, further comprising:
- adjusting the position of at least a portion of the second camera to align one more captured calibration marks captured by the second camera with the alignment target.

11. The method of claim 10, wherein displaying the second image on the display device along with the alignment target includes:
- superimposing the second image over an image captured by the first camera.

12. The method of claim 8,
- wherein the portion of the first camera is a lens and sensor assembly; and
- wherein a processor of the first camera is coupled to a first camera sensor included in the lens and sensor assembly by a cable.

13. The method of claim 8,
- wherein the portion of the first camera is the entire first camera.

14. A system for calibrating stereoscopic camera pairs, the system comprising:
- a first dome;
- a second dome, said first and second domes being rigidly attached to each other by a attachment member that secures the first dome to the second dome;
- a plurality of optical fibers extending into holes in said first and second domes; and
- wherein the first and second domes are made of a material which blocks external light from passing through to camera sensors of first and second cameras over which the first and second domes are placed, respectively.

15. The system of claim 14,
- wherein the attachment member is wider than the distance between the left and right domes and where the spacing between the left and right domes is less than the width of the attachment member;
- wherein the first and second domes are made of a light blocking material which blocks exterior light form passing through the dome material; and
- wherein the system further comprises:
- a light source for supplying light to the optical fibers extending through holes in said first dome and the second dome.

16. The system of claim 15, wherein said light source supplies different color light to the optical fibers extending into the first dome than to the optical fibers extending into the second dome.

17. The system of claim 15, further comprising:
- a display device for displaying a first image captured by a first camera of a stereoscopic camera pair to be calibrated superimposed on an alignment mark.

18. The system of claim 17, wherein the display device if further configured to display a second image captured by a second camera of the stereoscopic camera pair, to be calibrated superimposed on the alignment mark and the first image captured by the first camera of the stereoscopic camera pair.

* * * * *